US012626383B1

(12) United States Patent
Kerofsky et al.

(10) Patent No.: US 12,626,383 B1
(45) Date of Patent: May 12, 2026

(54) DEPTH INFORMATION GENERATION BASED ON LiDAR AND CAMERA INTEGRATION

(71) Applicant: QUALCOMM Incorporated, San Diego, CA (US)

(72) Inventors: Louis Joseph Kerofsky, San Diego, CA (US); Madhumitha Sakthi, Dublin, CA (US); Varun Ravi Kumar, San Diego, CA (US); Senthil Kumar Yogamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/982,851

(22) Filed: Dec. 16, 2024

(51) Int. Cl.
*G06T 7/521* (2017.01)
*G06T 7/55* (2017.01)
*B60T 8/171* (2006.01)

(52) U.S. Cl.
CPC ............... *G06T 7/521* (2017.01); *G06T 7/55* (2017.01); *B60T 8/171* (2013.01); *B60T 2210/32* (2013.01); *G06T 2207/10028* (2013.01); *G06T 2207/30252* (2013.01)

(58) Field of Classification Search
CPC .. G06T 7/50; G06T 7/521; G06T 7/55; G06T 17/05; G06T 2207/10028; G06T 2207/30252; B60T 8/171; B60T 2210/32
See application file for complete search history.

(56) References Cited

U.S. PATENT DOCUMENTS

| | | | | |
|---|---|---|---|---|
| 8,224,064 B1 * | 7/2012 | Hassebrook | ......... | G06V 10/145 |
| | | | | 356/3 |
| 10,169,680 B1 * | 1/2019 | Sachdeva | ............. | H04N 13/361 |
| 10,963,734 B1 * | 3/2021 | Wang | ......................... | G06T 7/74 |
| 11,131,753 B2 * | 9/2021 | Banerjee | ................. | H04N 5/04 |
| 11,373,411 B1 * | 6/2022 | Goh | ........................... | G06N 3/08 |
| 12,354,289 B2 * | 7/2025 | Kim | ........................ | G06T 7/521 |
| 2014/0064555 A1 * | 3/2014 | Sebastian | ............. | G01S 7/4808 |
| | | | | 382/103 |
| 2017/0242442 A1 * | 8/2017 | Minster | .................... | G06T 7/00 |
| 2018/0356526 A1 * | 12/2018 | Wang | ................. | G06V 10/143 |
| 2019/0120948 A1 * | 4/2019 | Yang | .................... | G01S 7/4817 |

(Continued)

FOREIGN PATENT DOCUMENTS

WO 2020104423 A1 5/2020

*Primary Examiner* — Brian P Yenke
(74) *Attorney, Agent, or Firm* — Shumaker & Sieffert, P. A.

(57) ABSTRACT

A device for generating depth information includes processing circuitry configured to: determine a camera frame timestamp indicative of when a camera frame is captured, the camera frame including image content across a capture angle range; determine a plurality of LiDAR frame timestamps each indicative of when a respective LiDAR frame of a plurality of LiDAR frames is captured over a scan time; assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

20 Claims, 7 Drawing Sheets

(56) References Cited

U.S. PATENT DOCUMENTS

| | | | |
|---|---|---|---|
| 2019/0387216 A1* | 12/2019 | Hicks | G01S 17/10 |
| 2020/0174130 A1 | 6/2020 | Banerjee et al. | |
| 2020/0326203 A1* | 10/2020 | Lund | G08G 1/04 |
| 2021/0003710 A1 | 1/2021 | Tan et al. | |
| 2021/0150279 A1* | 5/2021 | Dudzik | G01S 17/931 |
| 2021/0327128 A1* | 10/2021 | Yu | G06T 19/20 |
| 2021/0333378 A1* | 10/2021 | Theos | B66F 9/0755 |
| 2021/0370968 A1* | 12/2021 | Xiao | G01C 21/3848 |
| 2022/0043151 A1 | 2/2022 | Baker et al. | |
| 2022/0324437 A1 | 10/2022 | Blau et al. | |
| 2024/0127534 A1* | 4/2024 | Wang | G06T 19/20 |
| 2024/0331288 A1* | 10/2024 | Appia | G06T 7/10 |
| 2024/0371035 A1* | 11/2024 | Jadhav | G01S 17/86 |
| 2025/0264599 A1* | 8/2025 | Narayanan | G06T 7/246 |

* cited by examiner

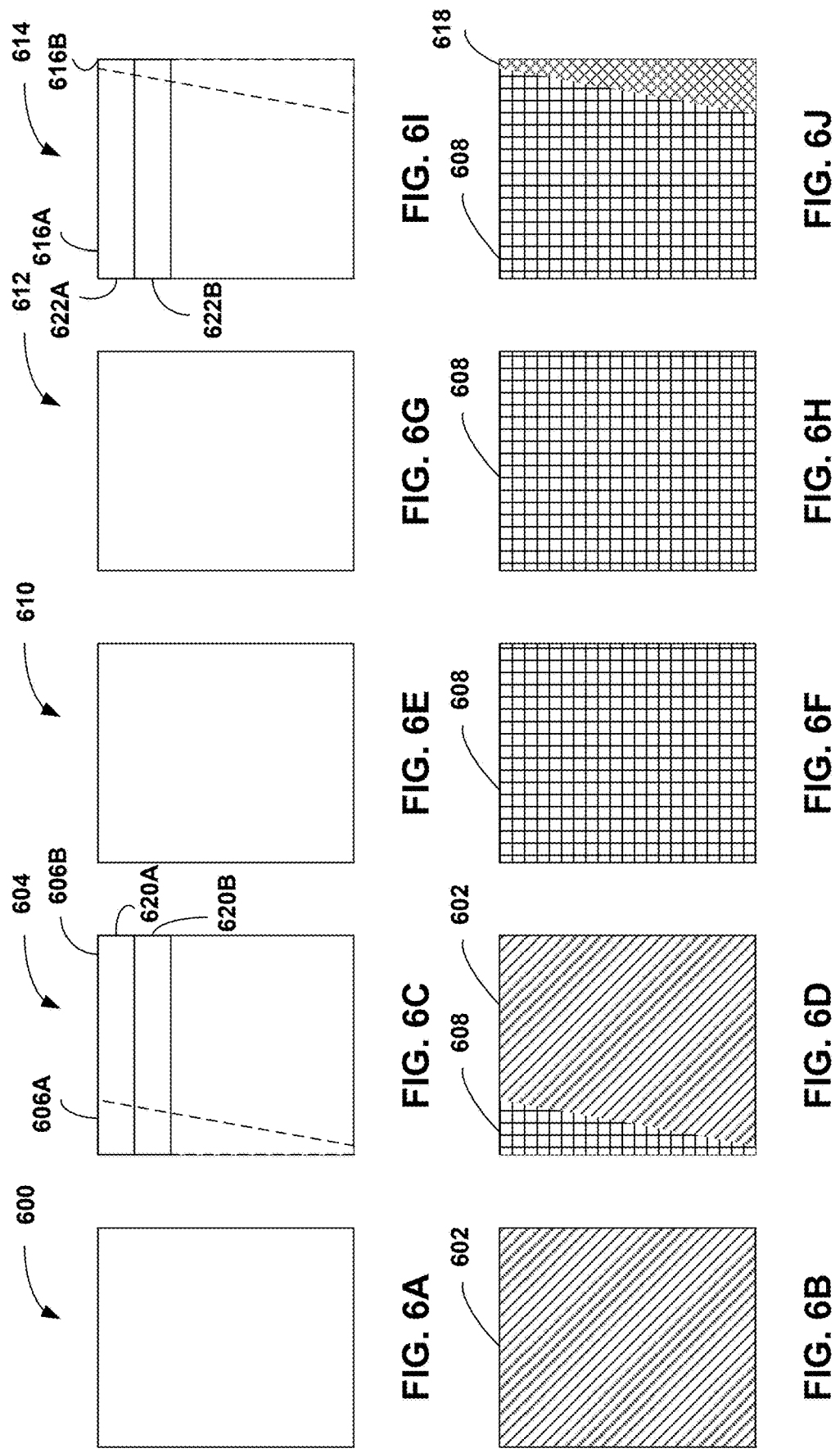

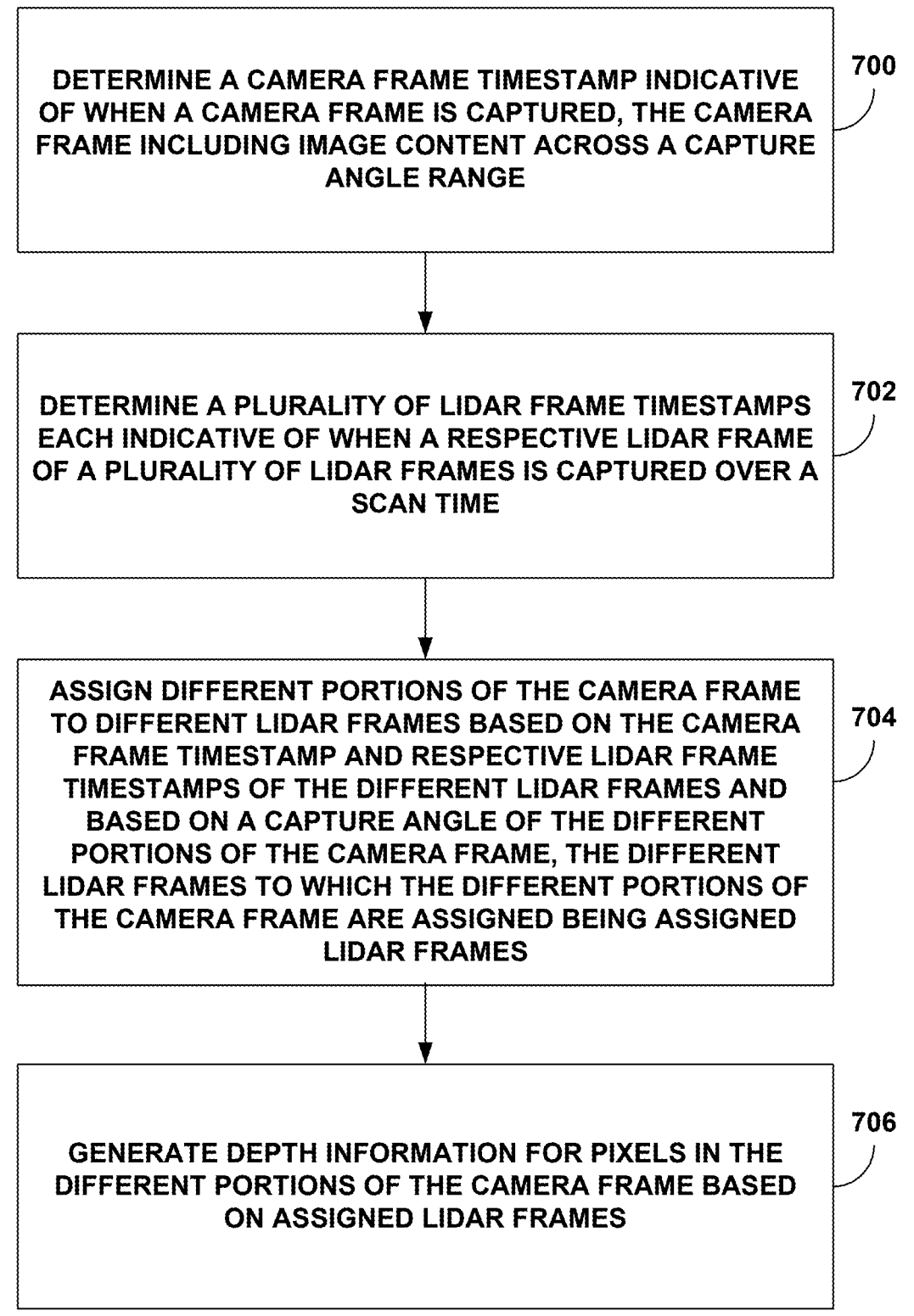

DETERMINE A CAMERA FRAME TIMESTAMP INDICATIVE OF WHEN A CAMERA FRAME IS CAPTURED, THE CAMERA FRAME INCLUDING IMAGE CONTENT ACROSS A CAPTURE ANGLE RANGE — 700

DETERMINE A PLURALITY OF LIDAR FRAME TIMESTAMPS EACH INDICATIVE OF WHEN A RESPECTIVE LIDAR FRAME OF A PLURALITY OF LIDAR FRAMES IS CAPTURED OVER A SCAN TIME — 702

ASSIGN DIFFERENT PORTIONS OF THE CAMERA FRAME TO DIFFERENT LIDAR FRAMES BASED ON THE CAMERA FRAME TIMESTAMP AND RESPECTIVE LIDAR FRAME TIMESTAMPS OF THE DIFFERENT LIDAR FRAMES AND BASED ON A CAPTURE ANGLE OF THE DIFFERENT PORTIONS OF THE CAMERA FRAME, THE DIFFERENT LIDAR FRAMES TO WHICH THE DIFFERENT PORTIONS OF THE CAMERA FRAME ARE ASSIGNED BEING ASSIGNED LIDAR FRAMES — 704

GENERATE DEPTH INFORMATION FOR PIXELS IN THE DIFFERENT PORTIONS OF THE CAMERA FRAME BASED ON ASSIGNED LIDAR FRAMES — 706

FIG. 7

DEPTH INFORMATION GENERATION BASED ON LiDAR AND CAMERA INTEGRATION

TECHNICAL FIELD

The disclosure relates to image processing including depth data generation.

BACKGROUND

A camera captures a camera frame that includes image content information, but may not provide sufficient depth information. A LiDAR system captures a LiDAR frame that includes a point cloud with three-dimensional coordinates for the points. A processing circuitry may be able to determine depth information for pixels in the camera frame using the three-dimensional coordinates of corresponding points in the LiDAR frame.

SUMMARY

In general, this disclosure describes example techniques to generate depth information for pixels in a camera frame based on points in a LiDAR frame accounting for LiDAR and cameras capturing frames at different times, as well as movement of a vehicle that includes the LiDAR and camera. The LiDAR and camera may capture frames at different times due to the camera and LiDAR capturing frames at different frame rates, as well as due to the scan time that the LiDAR takes to capture one frame. As such, camera frames and LiDAR frames typically do not align exactly. These issues may be further compounded due to movement of the vehicle. The LiDAR and camera capturing frames at different times can lead to discrepancies in the depth information generated for a camera frame, such as when the vehicle is moving. This temporal misalignment can result in inaccurate depth data, affecting the performance of systems relying on this information, such as autonomous vehicles or advanced driver assistance systems (ADAS), as well as other systems that utilize depth information such as object detection systems, neural radiance field (NeRF) systems that generate image content, etc.

In one or more examples of the disclosure, processing circuitry may assign different LiDAR frames to different portions of the camera frame based on timestamps for when the LiDAR frames and camera frame were captured, as well as based on capture angle of the different portions of the camera frame. The processing circuitry may generate depth information for pixels in the different portions of the camera based on the assigned LiDAR frames. The different LiDAR frames to which the different portions of the camera frame are assigned may be referred to as assigned LiDAR frames.

For example, the processing circuitry may determine which points in the assigned LiDAR frames correspond to which pixels in the camera frame, determine depth values for the points in the assigned LiDAR frames, and generate the depth information for the pixels in the different portions of the camera frame based on the determined depth values for the points in the assigned LiDAR frames and the correspondence of the points in the assigned LiDAR frames and the pixels in the camera frame. In some examples, the processing circuitry may scale the depth values for the points based on speed of the vehicle to compensate for the speed at which the vehicle is moving. In some examples, the processing circuitry may further adjust the depth values to account for the rolling shutter, where the camera captures different rows or columns of pixels at different times.

By assigning different portions of the camera frame to different LiDAR frames based on these timestamps and the capture angles of the camera frame portions, the processing circuitry can generate more accurate depth information for the pixels in the camera frame. Accordingly, the example techniques may better ensure that the generated depth information corresponds accurately to the image content, even though the LiDAR and camera capture data at different times, and when the vehicle is moving. The processing circuitry may scale the depth values from the LiDAR frames based on the speed of the vehicle and other factors, further enhancing the accuracy of the depth information generated.

In one example, the disclosure describes a device for generating depth information, the device comprising: one or more memories; and processing circuitry coupled to the one or more memories, wherein the processing circuitry is configured to: determine a camera frame timestamp indicative of when a camera frame is captured, the camera frame including image content across a capture angle range; determine a plurality of LiDAR frame timestamps each indicative of when a respective LiDAR frame of a plurality of LiDAR frames is captured over a scan time; assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

In one example, the disclosure describes a method of generating depth information, the method comprising: determining a camera frame timestamp indicative of when a camera frame is captured, the camera frame including image content across a capture angle range; determining a plurality of LiDAR frame timestamps each indicative of when a respective LiDAR frame of a plurality of LiDAR frames is captured over a scan time; assigning different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generating depth information for pixels in the different portions of the camera frame based on the assigned LiDAR frames.

In one example, the disclosure describes a computer-readable storage medium storing instructions thereon that when executed cause one or more processors to: determine a camera frame timestamp indicative of when a camera frame is captured, the camera frame including image content across a capture angle range; determine a plurality of LiDAR frame timestamps each indicative of when a respective LiDAR frame of a plurality of LiDAR frames is captured over a scan time; assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

The details of one or more examples are set forth in the accompanying drawings and the description below. Other features, objects, and advantages will be apparent from the description, drawings, and claims.

BRIEF DESCRIPTION OF DRAWINGS

FIGS. 6A-6J illustrate additional example camera frames and assignment of different portions of the camera frame to different LiDAR frames to generate depth information.

FIG. 7 is a flowchart illustrating a method of image processing according to one or more example techniques described in this disclosure.

DETAILED DESCRIPTION

Figure 1:
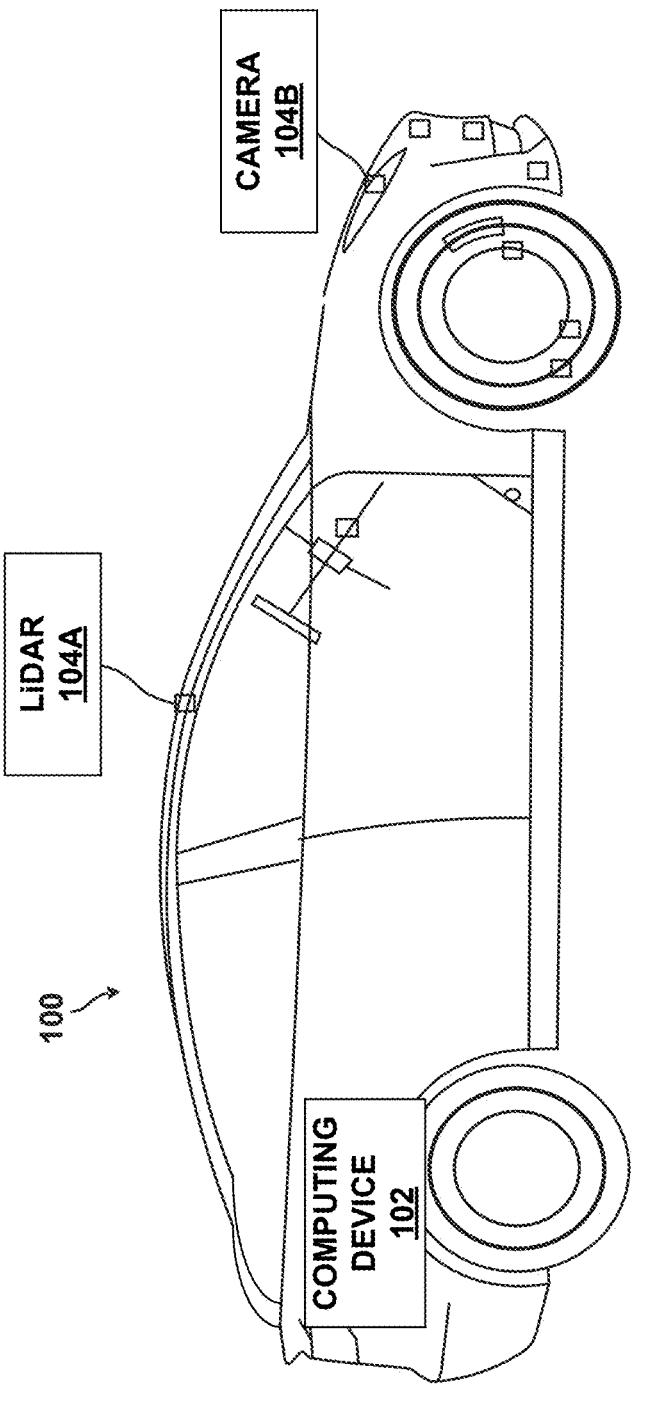
FIG. 1 is a diagram of an example vehicle in accordance with the techniques of this disclosure for object detection in accordance with one or more examples described in this disclosure.

LiDAR (Light Detection and Ranging) and cameras are commonly used in various applications to generate depth information for pixels in a camera frame. LiDAR systems work by emitting laser pulses and measuring the time it takes for the pulses to return after hitting an object. This time-of-flight measurement allows the LiDAR system to calculate the distance to the object, creating a 3D point cloud that represents the environment. Cameras, on the other hand, capture 2D images of the environment, providing visual information in the form of pixels.

To generate a LiDAR frame, the LiDAR laser rotates horizontally over a full 360-degree rotation, periodically emitting the laser pulses to create the 3D point cloud. Accordingly, each point may be associated with a point angle indicating the angle (e.g., yaw angle) of the point relative to the LiDAR laser. The scan time refers to the amount of time the LiDAR laser took to fully rotate. The 3D point cloud from one rotation of the LiDAR laser may be referred to as a LiDAR frame. In some examples, a LiDAR frame timestamp may be indicative of when a LiDAR frame is captured over a scan time. That is, although the amount of time it takes to generate a LiDAR frame may not be instantaneous (e.g., due to the scan time), there may be one timestamp associated with the LiDAR frame.

In some examples, a camera frame is captured instantaneously, using global shutter. With a rolling shutter, pixels in different rows or columns may be captured at different times, but are generally captured sequentially (e.g., top row, then next row, then next row, until last row). The camera frame may also be associated with a timestamp indicative of when the camera frame is captured.

The image content (e.g., visual information) in the camera frame may cover a capture angle range (e.g., field-of-view). For instance, the camera frame may be captured image content within a range of −75-degrees to +75-degrees. Wider or narrower capture angles are also possible. The capture angle may also be referred to as a viewing angle. In some examples, one or more columns of the image content in a camera frame may be associated with one capture angle. As one example, the capture angle may be yaw angle from measured relative to the center of the camera sensor of the camera used to capture the camera frame.

To generate depth information, in some examples, processing circuitry may identify a closest-in-time LiDAR frame to the camera frame based on the LiDAR frame timestamp and the camera frame timestamp. The processing circuitry may determine a capture angle for a pixel in the camera frame and determine a point in the closest-in-time LiDAR frame having a point angle closest to the capture angle. The processing circuitry may utilize the depth value associated the determined point to generate the depth information for the pixel in the camera frame. This process creates a depth map that provides detailed information about the distance of objects from the camera, enhancing the visual data with depth information.

While such techniques may function well in some cases, there may be issues such as when a vehicle that includes the LiDAR and camera is moving. For instance, one challenge in using LiDAR and camera frames together is the temporal misalignment between the two types of data. LiDAR and cameras often operate at different frame rates and capture images at different times. This temporal discrepancy can lead to inaccuracies when trying to combine the depth information from LiDAR with the visual information from the camera. Additionally, the movement of the vehicle or platform on which the camera and LiDAR laser are mounted can further complicate the synchronization of the data, as the relative positions of objects in the environment change continuously.

For example, due to the points in the LiDAR frame being captured at different times, the point angles of the points are also associated with different times. As described above, different portions of the camera frame may be associated with different capture angles. In some cases, although the camera frame be captured instantaneously with global shutter or near instantaneously with rolling shutter, because the point angles of the points are associated with different times, it may be possible that different LiDAR frames are closer in time to different portions of the camera frame, where the different portions of the camera frame are associated with different capture angles.

Accordingly, in one or more examples, processing circuitry may be configured to determine a camera frame timestamp indicative of when a camera frame is captured, the camera frame including image content across a capture angle range. The processing circuitry may also determine a plurality of LiDAR frame timestamps each indicative of when a respective LiDAR frame of a plurality of LiDAR frames is captured over a scan time. In accordance with one or more examples, the processing circuitry may assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames. The processing circuitry may generate depth information for pixels in the different portions of the camera frame based on the assigned LiDAR frames.

For example, the processing circuitry may determine which points in the assigned LiDAR frames correspond to which pixels in the camera frame based on capture angles of the pixels and point angles of the points, and determine depth values for the points in the assigned LiDAR frames. The processing circuitry may generate the depth information for the pixels in the different portions of the camera frame based on the determined depth values for the points in the assigned LiDAR frames and the correspondence of the points in the assigned LiDAR frames and the pixels in the camera frame. For instance, the processing circuitry may set the depth values of the points in the assigned LiDAR frames as the depth information for the corresponding pixels.

While the above example techniques may function well, further refinements may be possible. For instance, the above example techniques may be referred to intra-frame transition because the processing circuitry generates the depth information for pixels in the same camera frame using different LiDAR frames. In some examples, the processing circuitry may be further configured to perform column or row-level transition.

For example, as the vehicle moves, a stationary object may become closer or farther away from the vehicle depending on the direction at which the vehicle is moving. Accordingly, in the LiDAR frames, the points of the same object may be captured at different distances relative to the LiDAR laser, resulting in an inaccurate determination that a stationary object is at different depths. If depth values from the points in these LiDAR frames are used to generate depth information for the pixels in the camera frame, the depth information may be inaccurate.

In one or more examples, the processing circuitry may be configured to compensate for the movement of the vehicle. For instance, the processing circuitry may be configured to determine respective time differences between the camera frame timestamp and the respective LiDAR frame timestamps of the assigned LiDAR frames, and determine a speed of a vehicle that includes a camera used for capturing the camera frame and a LiDAR used for capturing the LiDAR frames. The processing circuitry may scale depth values from the different LiDAR frames (e.g., the depth values of the corresponding points in the assigned LiDAR frames) based on the speed and the respective time differences. For example, the scaled depth values may equal depth values in the LiDAR frames plus "delta depth," where delta depth is equal to speed multiplied by the time differences. The processing circuitry may generate the depth information for the pixels in the different portions of the camera frame based on the scaled depth values of the assigned LiDAR frames.

The above described intra-frame transitions and column or row-level transitions. In some examples, further refinements at the pixel-level (e.g., pixel-level transitions) may be possible to compensate for rolling shutter. For instance, as described above, in rolling shutter, pixels in the camera frame may be captured at different times. Although the amount of time it takes to capture an entire camera frame with rolling shutter is less than the scan time of a LiDAR frame, in a relatively fast moving vehicle, the difference in when pixels are captured may impact the accuracy of the depth information.

For pixel-level transition, in one or more examples, the processing circuitry may be configured to access timing information of when the different portions of the camera frame are captured based on a rolling shutter of a camera that captured the camera frame. In such examples, to assign different portions of the camera frame to different LiDAR frames, the processing circuitry may be configured to assign, at a pixel-level, different pixels of the camera frame to different LiDAR frames based on the camera frame timestamp and respective LiDAR frame timestamps of the different LiDAR frames, the capture angle of the different portions of the camera frame, and the timing information. The processing circuitry may then generate depth information for pixels in the different portions of the camera frame based on the assigned LiDAR frames.

FIG. 1 shows an example vehicle 100. Vehicle 100 in the example shown may comprise a passenger vehicle such as a car or truck that can accommodate a human driver and/or human passengers. Other examples of vehicle 100 include robots or other devices that move. For ease of illustration and description, vehicle 100 is described with respect to a passenger vehicle.

In one example, vehicle 100 may comprise an autonomous vehicle, semi-autonomous vehicle and/or an advanced driver assistance system (ADAS). Vehicle 100 may be referred to as an "ego" vehicle. Vehicle 100 may include a vehicle body suspended on a chassis, in this example comprised of four wheels and associated axles. A propulsion system such as an internal combustion engine, hybrid electric power plant, or even all-electric engine may be connected to drive some or all of the wheels via a drive train, which may include a transmission (not shown). A steering wheel may be used to steer some or all of the wheels to direct vehicle 100 along a desired path when the propulsion system is operating and engaged to propel the vehicle 100. A steering wheel or the like may be optional for Level 5 implementations. Computing device 102 may provide autonomous capabilities in response to signals continuously provided in real-time from an array of sensors, as described more fully below.

Computing device 102 may be one or more onboard computers that may be configured to perform deep learning and/or artificial intelligence functionality and output autonomous operation commands to self-drive vehicle 100 and/or assist the human vehicle driver in driving. Computing device 102 may send command signals to operate the vehicle brakes via one or more braking actuators, operate steering mechanism via a steering actuator, and operate the propulsion system which also receives an accelerator/throttle actuation signal. Actuation may be performed by methods known to persons of ordinary skill in the art, with signals typically sent via the Controller Area Network data interface ("CAN bus")—a network inside modern cars used to control brakes, acceleration, steering, windshield wipers, and the like. The CAN bus may be configured to have dozens of nodes, each with its own unique identifier (CAN ID). The bus may be read to find steering wheel angle, ground speed, engine RPM, button positions, and other vehicle status indicators. The functional safety level for a CAN bus interface is typically Automotive Safety Integrity Level (ASIL) B. Other protocols may be used for communicating within a vehicle, including FlexRay and Ethernet.

In one example, an actuation controller on vehicle 100 may include dedicated hardware and software, allowing control of throttle, brake, steering, and shifting. The hardware may provide a bridge between the vehicle's CAN bus and computing device 102, forwarding vehicle data to computing device 102 including the turn signal, wheel speed, acceleration, pitch, roll, yaw, Global Positioning System ("GPS") data, tire pressure, fuel level, sonar, brake torque, and others. Similar actuation controllers may be configured for any other make and type of vehicle, including special-purpose patrol and security cars, robo-taxis, long-haul trucks including tractor-trailer configurations, tiller trucks, agricultural vehicles, industrial vehicles, and buses.

As illustrated, vehicle 100 includes computing device 102, LiDAR 104A, and camera 104B. These components work together to capture and process data for generating accurate depth information for the environment of vehicle 100.

Computing device 102 may be configured to process the frames captured by LiDAR 104A (e.g., LiDAR frames) and camera 104B (e.g., camera frames). Computing device 102 includes processing circuitry configured to determine a camera frame timestamp indicative of when a camera frame is captured, the camera frame including image content across a capture angle range. Computing device 102 also determines a plurality of LiDAR frame timestamps each indicative of when a respective LiDAR frame of a plurality of LiDAR frames is captured over a scan time.

LiDAR 104A emits laser pulses and measures the time it takes for the pulses to return after hitting objects in the environment. This time-of-flight measurement allows LiDAR 104A to create a 3D point cloud representing the surroundings. Each point in the LiDAR frame is associated with a depth value, which indicates the distance to the object. LiDAR 104A captures frames at regular intervals, providing continuous depth data to computing device 102.

That is, to generate a LIDAR frame, LiDAR 104A periodically transmits the laser pulse while rotating the laser. The amount of time it takes the laser to make one full rotation is referred to as a scan time. The scan time may be 0.1 seconds(s), but other scan times are possible. Each time the laser of LiDAR 104A outputs a laser pulse, LiDAR 104A may determine a point in the 3D point cloud, and associated depth value for that point. In addition to the depth value, each point may be associated with a point angle. The point angle of a point refers to the angle of the laser when the laser outputted the pulse to identify the point in the point cloud. One example of the point angle is the yaw angle of the laser when LiDAR 104A identified the point the point cloud.

Camera 104B captures 2D images of the environment, providing visual information in the form of pixels. The camera frames include image content across a capture angle range. For example, camera 104B may be configured to capture a camera frame instantaneously for global shutter where all photodiodes on the sensor of camera 104B are exposed at the same time, or nearly instantaneously for rolling shutter where rows or columns of photodiodes on the sensor of camera 104B are exposed sequentially. Although a camera frame captured with rolling shutter may not be captured instantaneously, in general the amount of time it takes to capture a camera frame with rolling shutter is substantially less than a scan time for capturing a LiDAR frame.

Each pixel in the camera frame may have a corresponding capture angle. Camera 104B may have a field of view (FOV), and may be represented as an angular field of view (AFOV). The AFOV may specify a full angle in degrees of image content that camera 104B can capture. For instance, camera 104B may have an FOV of −75-degrees to +75-degrees, but other FOVs are possible. In this example, a hypothetical ray extending from the center of the sensor of camera 104B may be considered as being at 0-degrees. The image content captured on a first side (e.g., left side) of 0-degrees may range from −75-degrees to 0-degrees, and image content captured on a second side (e.g., right-side) of 0-degrees may range from 0-degrees to +75-degrees.

Accordingly, pixels that include image content furthest left of camera 104B that is still captured by camera 104B may be a column of pixels furthest left of the camera frame. Pixels in furthest left column may be associated with a capture angle of −75-degrees. Similarly, pixels that include image content furthest right of camera 104B that is still captured by camera 104B may be a column of pixels furthest right of the camera frame. Pixels in furthest right column may be associated with a capture angle of +75-degrees. In this manner, each pixel may be associated with a capture angle between maximum and minimum angles of the FOV. In some examples, the capture angle may be considered as a yaw angle of the pixels in the camera frame.

In accordance with one or more examples described in this disclosure, computing device 102 may be configured to generate depth information for pixels in a camera frame based on LiDAR frames (e.g., depth values of points in the LiDAR frames). As described in more detail, computing device 102 may determine which LiDAR frames to utilize to generate the depth information for the pixels, which may be referred to as intra-frame transition because different portions of the camera frame may utilize different LiDAR frames for generating the depth information. In some examples, computing device 102 may incorporate the speed of vehicle 100 to adjust the depth values from the different LiDAR frames, referred to as column or row-level transition. Computing device 102 may also incorporate information related to rolling shutter, referred to as pixel-level transitions.

By combining the depth values from the LiDAR frames with the image content from the camera frames, computing device 102 generates accurate depth information for the pixels in the camera frame. This depth information is useful for various applications, such as obstacle detection, path planning, and autonomous navigation, enabling vehicle 100 to navigate its environment safely and efficiently. For example, computing device 102 may be configured to control an operating parameter of vehicle 100 based on the depth information. Examples of the operating parameter include a braking parameter or a path planning parameter. For instance, if computing device 102 determines that the object is closer than a threshold amount based on the depth information, computing device 102 may cause vehicle 100 to immediately brake. As another example, computing device 102 may determine where objects are located so as to plan a path between the objects.

As described above, computing device 102 may determine which LiDAR frames to utilize for generating the depth information. Some techniques determined which LiDAR frame was captured closest in time to when the camera frame was captured. In those techniques, the depth information for pixels in the camera frame were based on the depth values of points in the one LiDAR frame.

However, techniques that utilize a single LiDAR frame to generate depth information may not accurately generate the depth information because the scan time of the LiDAR frame is not accounted for. Moreover, the speed of the vehicle is not accounted for, and the timing of the rolling shutter is not accounted for, resulting in inaccurate depth information.

In accordance with one or more examples described in this disclosure, computing device 102 may be configured to utilize the capture angle of the portions of the camera frame to determine points from which LiDAR frame to use for generating depth information for pixels in the camera frame. For instance, computing device 102 may determine a camera frame timestamp indicative of when a camera frame is captured with camera 104B. The camera frame includes image content across a capture angle range (e.g., −75-degrees to +75-degrees).

In addition, computing device 102 may determine a plurality of LiDAR frame timestamps each indicative of when a respective LiDAR frame of a plurality of LiDAR frames is captured over a scan time. In one or more examples, each LiDAR frame may be associated with a LiDAR frame timestamp generally indicative of when the LiDAR frame is captured (e.g., such as start of when LiDAR frame is captured or end of when LiDAR frame is captured). However, the LiDAR frame may not be captured instantaneously, but over a scan time (e.g., time it takes for laser of LiDAR 104A to make a full rotation).

Computing device 102 may assign different portions of the camera frame to different LiDAR frames based on the camera frame timestamp and respective LiDAR frame timestamps of the different LiDAR frames and based on a capture angle of the different portions of the camera frame. The different LiDAR frames to which the different portions of the camera frame are assigned may be referred to as assigned LiDAR frames. As an example, assume there are two LiDAR frames. Computing device 102 may determine a first LiDAR frame timestamp indicative of when a first LiDAR frame is captured and a second LiDAR frame timestamp indicative of when a second LiDAR frame is captured. In this example, the first LiDAR frame may be a LiDAR frame that is nearest previous LiDAR frame to the camera frame, and the second LiDAR frame may be a LIDAR frame that is the next LiDAR frame to the camera frame.

To assign different portions of the camera frame to different LiDAR frames based on the camera frame timestamp and respective LiDAR frame timestamps of the different LiDAR frames and based on the capture angle of the different portions of the camera frame, computing device 102 may determine that the first LiDAR frame is closer in time to a first portion of the different portions of the camera frame than the second LiDAR frame is to the first portion based on a first capture angle of the first portion, the camera frame timestamp, and the first LiDAR frame timestamp. In this example, computing device 102 may assign the first portion to the first LiDAR frame. Similarly, computing device 102 may determine that the second LiDAR frame is closer in time to a second portion of the different portions of the camera frame than the first LiDAR frame is to the second portion based on a second capture angle of the second portion, the camera frame timestamp, and the second LiDAR frame timestamp. Computing device 102 may assign the second portion to the second LiDAR frame.

Computing device 102 may generate depth information for pixels in the different portions of the camera frame based on assigned LiDAR frames. For example, computing device 102 may determine which points in the assigned LiDAR frames correspond to which pixels in the camera frame based on capture angles of the pixels and point angles of the points in the assigned LiDAR frames. As an example, if the point angle of a point in a LiDAR frame is approximately the same (e.g., closest to) the capture angle of a pixel in the camera frame, then point in the LiDAR frame and the pixel in the camera frame may correspond to each other.

In one or more examples, the points in the LiDAR frames may be relatively sparse. Accordingly, there may not be a one-to-one correspondence of points in the LiDAR frames to pixels in the camera frame. However, there may be a capture angle associated with each pixel, for which there may be a point having a point angle that is closes to the capture angle of the pixel.

To determine the correspondence, computing device 102 may determine the point angles and capture angles based on relatively the same 0-degree hypothetical ray. For example, the 0-degree of the laser of LiDAR 104A may correspond to the 0-degree of FOV of camera 104B. In this manner, computing device 102 may be able to compare the capture angle of pixels in the camera frame to point angles of points in the LiDAR frames.

Computing device 102 may determine depth values for the points in the assigned LiDAR frames, and generate the depth information for the pixels in the different portions of the camera frame based on the determined depth values for the points in the assigned LiDAR frames and the correspondence of the points in the assigned LiDAR frames and the pixels in the camera frame. For example, computing device 102 may set the depth values of the points in the assigned LiDAR frames as the depth information for corresponding pixels. In some examples, computing device 102 may perform interpolation between the depth values of points in the assigned LiDAR frames, such as near where there is transition in selection of the first LiDAR frame and the second LiDAR frame to achieve smoother transitions and better alignment.

In some examples, even if the portions of the camera frame are assigned to the same LiDAR frame or where portions of the camera frame are assigned to different LiDAR frames, computing device 102 may determine a speed at which vehicle 100 is moving to scale the depth values of the points in the assigned LiDAR frame or frames. For example, because the scan time for generating a LiDAR frame is non-zero and vehicle 100 is moving, an object may be further or closer to vehicle 100 during the time it takes to generate the LiDAR frame. Accordingly, in some examples, computing device 102 may determine how much distance vehicle 100 moved from when the camera frame was captured and the assigned LiDAR frames were captured (e.g., the time when the corresponding points were captured), and use the distance traveled to scale the depth values of the points in the LiDAR frames.

For instance, computing device 102 may determine respective time differences between the camera frame timestamp and the respective LiDAR frame timestamps of the assigned LiDAR frames. Computing device 102 may determine a speed of vehicle 100 (e.g., based on sensors of vehicle 100), where vehicle 100 includes camera 104B used for capturing the camera frame and LiDAR 104A used for capturing the LiDAR frames. Computing device 102 may scale depth values (e.g., of points) from the assigned LiDAR frames based on the speed and the respective time differences, and generate the depth information for the pixels in the different portions of the camera frame based on the scaled depth values of the assigned LiDAR frames.

In one or more examples, if rolling shutter is enabled, computing device 102 may access timing information of when the different portions of the camera frame are captured based on a rolling shutter of camera 104B that captured the camera frame. The time information may indicate when a row or column of photodiodes in the sensor of camera 104B are to capture image content. Computing device 102 may assign, at a pixel-level, different pixels of the camera frame to different LiDAR frames based on the camera frame timestamp and respective LiDAR frame timestamps of the different LiDAR frames, the capture angle of the different portions of the camera frame, and the timing information. In this manner, the depth information may be even more accurate because vehicle 100 may move during the sequential capture of image content on a row-by-row or column-by-column basis associated with the rolling shutter.

Figure 2:
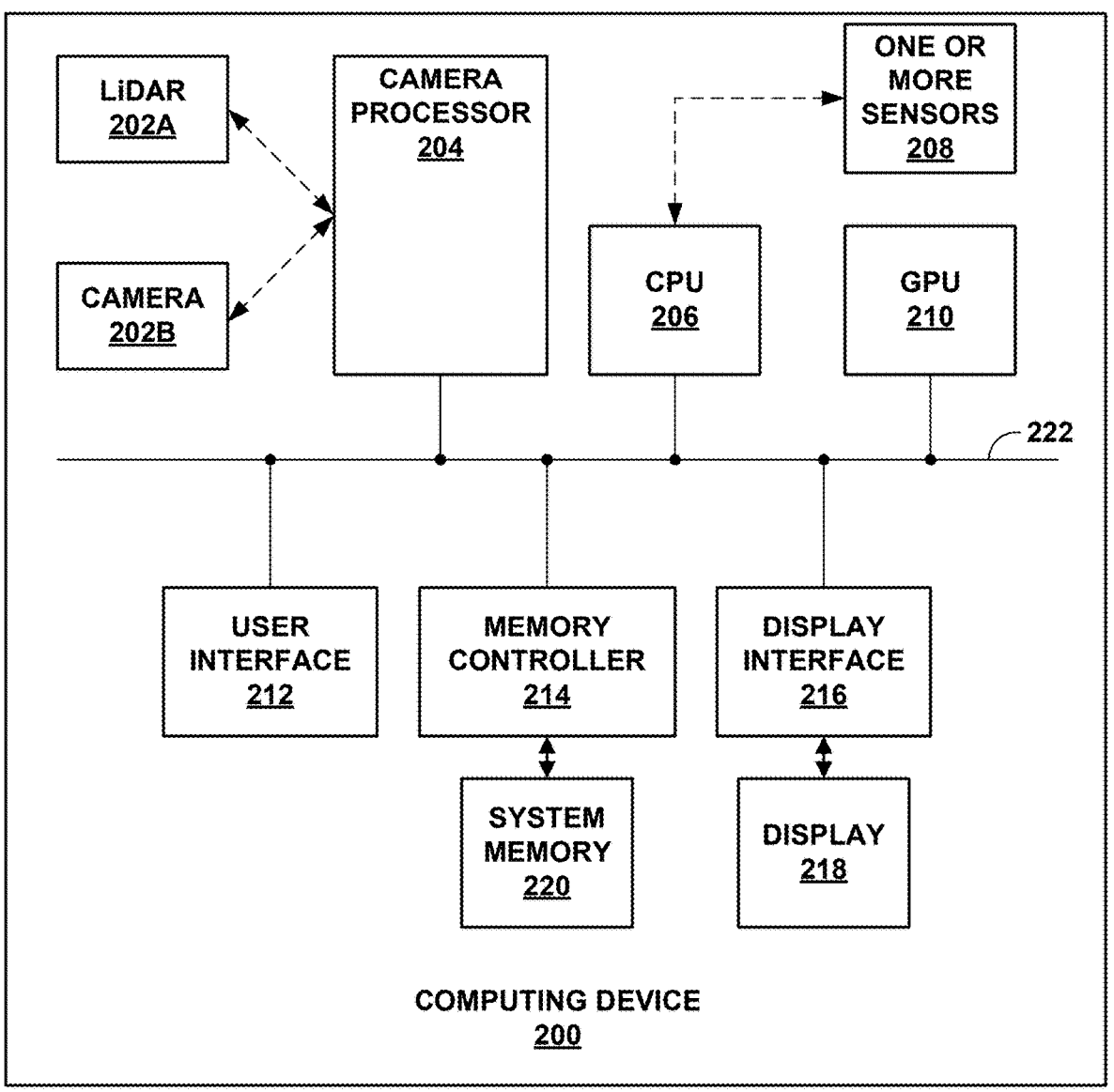
FIG. 2 is a block diagram of a device configured to perform one or more of the example techniques described in this disclosure.

FIG. 2 is a block diagram of a device configured to perform one or more of the example techniques described in this disclosure. One example of computing device 200 of FIG. 2 is computing device 102 of FIG. 1. However, there may be other examples of computing device 200 such as any device that moves having cameras and LiDAR used for depth information generation. Examples of computing device 200 include a laptop, a mobile device such as a tablet computer, a wireless communication device (such as, e.g., a mobile telephone, a cellular telephone, a satellite telephone, and/or a mobile telephone handset).

As illustrated in the example of FIG. 2, computing device 200 includes camera processor 204 that receives LiDAR frames from LiDAR 202A and camera frames from camera 202B. Camera processor 204 is an example of an image signal processor (ISP). LiDAR 202A and camera 202B may be similar to LiDAR 104A and camera 104B of FIG. 1. Computing device 200 also includes a central processing unit (CPU) 206 that receives data from one or more sensors 208. For instance, where LiDAR 202A and camera 202B are on a vehicle (e.g., vehicle 100), examples of one or more sensors 208 include an IMU sensor, a steering sensor, and a speed sensor, or any other sensors that may assist in depth information generation. Use of sensors 208 is not necessary in all examples.

Computing device 200 includes graphical processing unit (GPU) 210, and user interface 212. Memory controller 214 of computing device 200 provides access to system memory 220 of computing device 200. Display interface 216 of computing device 200 that outputs signals that cause graphical data to be displayed on display 218 of computing device 200.

Also, although the various components are illustrated as separate components, in some examples the components may be combined to form a system on chip (SoC). As an example, camera processor 204, CPU 206, GPU 210, and display interface 216 may be formed on a common integrated circuit (IC) chip. In some examples, one or more of camera processor 204, CPU 206, GPU 210, and display interface 216 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 222. Bus 222 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

CPU 206 may comprise a general-purpose or a special-purpose processor that controls operation of computing device 200. A user may provide input to computing device

200 to cause CPU 206 to execute one or more software applications. The user may provide input to computing device 200 via one or more input devices (not shown) such as a keyboard, a mouse, a microphone, a touch pad or another input device that is coupled to computing device 200 via user interface 212.

One example of the software application is a camera application. CPU 206 executes the camera application, and in response, the camera application causes CPU 206 to generate content that display 218 outputs. For instance, display 218 may output information such as light intensity, whether flash is enabled, and other such information. The user of computing device 200 may interface with display 218 to configure the manner in which the images are generated.

GPU 210 may generate graphical information that provides the user information about the image frames to be captured. For instance, GPU 210 may generate a graphic that overlays image content from camera frames captured with camera 202B (e.g., road traces, projected path, etc.).

Memory controller 214 facilitates the transfer of data going into and out of system memory 220. For example, memory controller 214 may receive memory read and write commands, and service such commands with respect to system memory 220 in order to provide memory services for the components in computing device 200. Memory controller 214 is communicatively coupled to system memory 220. Although memory controller 214 is illustrated in the example of computing device 200 of FIG. 2 as being a processing circuit that is separate from both CPU 206 and system memory 220, in other examples, some or all of the functionality of memory controller 214 may be implemented on one or both of CPU 206 and system memory 220.

System memory 220 may store program modules and/or instructions and/or data that are accessible by camera processor 204, CPU 206, and GPU 210. For example, system memory 220 may store user applications (e.g., instructions for the camera application), resulting images from camera processor 204, etc. System memory 220 may additionally store information for use by and/or generated by other components of computing device 200. For example, system memory 220 may act as a device memory for camera processor 204. System memory 220 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 220 may include instructions that cause camera processor 204, CPU 206, GPU 210, and display interface 216 to perform the functions ascribed to these components in this disclosure. Accordingly, system memory 220 may be a computer-readable storage medium having instructions stored thereon that, when executed, cause one or more processors (e.g., camera processor 204, CPU 206, GPU 210, and display interface 216) to perform various functions.

In some examples, system memory 220 is a non-transitory storage medium. The term "non-transitory" indicates that the storage medium is not embodied in a carrier wave or a propagated signal. However, the term "non-transitory" should not be interpreted to mean that system memory 220 is non-movable or that its contents are static. As one example, system memory 220 may be removed from computing device 200, and moved to another device. As another example, memory, substantially similar to system memory 220, may be inserted into computing device 200. In certain examples, a non-transitory storage medium may store data that can, over time, change (e.g., in RAM).

Camera processor 204, CPU 206, and GPU 210 may store image data, and the like in respective buffers that are allocated within system memory 220. Display interface 216 may retrieve the data from system memory 220 and configure display 218 to display the image represented by the generated image data. In some examples, display interface 216 may include a digital-to-analog converter (DAC) that is configured to convert the digital values retrieved from system memory 220 into an analog signal consumable by display 218. In other examples, display interface 216 may pass the digital values directly to display 218 for processing.

Display 218 may include a monitor, a television, a projection device, a liquid crystal display (LCD), a plasma display panel, a light emitting diode (LED) array, or another type of display unit. Display 218 may be integrated within computing device 200. For instance, display 218 may be a screen of a mobile telephone handset or a tablet computer. Alternatively, display 218 may be a stand-alone device coupled to computing device 200 via a wired or wireless communications link. For instance, display 218 may be a computer monitor or flat panel display connected to a personal computer via a cable or wireless link.

In accordance with one or more examples described in this disclosure, the processing circuitry of computing device 200, which is an example of computing device 102, may be configured to perform the one or more examples techniques. The processing circuitry may be any one of or any combination of camera processor 204, CPU 206, GPU 210, or other circuitry of computing device 200.

LiDAR 202A may be configured to assign a LiDAR frame timestamp to each LiDAR frame that LiDAR 202A generates. Because each LiDAR frame may not be generated instantaneously, and instead generated over a scan time, the timestamp of each LiDAR frame may be based on the start or ending of the generation of the LiDAR frame. Camera 202B may be configured assign a camera frame timestamp to each camera frame that camera 202B generates. However, some examples, camera processor 204 may be configured to assign LiDAR frame timestamps to LiDAR frames and camera frame timestamps to camera frames.

In accordance with one or more examples, the processing circuitry may assign different portions of the camera frame to different LiDAR frames based on the camera frame timestamp and respective LiDAR frame timestamps of the different LiDAR frames, and based on a capture angle of the different portions of the camera frame. The processing circuitry may be configured to assign different portions of the camera frame to different LiDAR frames to ensure that each portion of the camera frame is matched with the most temporally and spatially relevant LiDAR frame. The different LiDAR frames to which the different portions of the camera frame are assigned may be referred to as assigned LiDAR frames.

For example, the processing circuitry may determine which LiDAR frame of the plurality of LiDAR frames is closest in time to a first portion of the camera frame having a first capture angle, determine which LiDAR frame of the plurality of LiDAR frames is closest in time to a second portion of the camera frame having a second capture angle, and repeat such operations for the different portions of the camera frame. The first capture angle may be a specific capture angle, or may represent a subrange of the capture angle range of camera 202B. Similarly, the second capture angle may be a specific capture angle, or may represent a subrange of the capture angle range of camera 202B. Assume that a first LiDAR frame is closest in time to the first portion of the camera frame, and a second LiDAR frame is closes in time to the second portion of the camera frame.

To generate the depth information, the processing circuitry may determine which points in the assigned LiDAR frames correspond to which pixels in the camera frame based on capture angles of the pixels and point angles of the points. Again, the capture angle of a pixel refers to the angle of the image content represented by that pixel, and the point angle of a point refers to the angle of the laser at which the point was identified. A pixel in the camera frame may correspond to a point in a LiDAR frame if the point angle of the point is closest to the capture angle of the pixel among all of the points in the LiDAR frame. Using these depth values and the correspondence between the points in the LiDAR frames and the pixels in the camera frame, the processing circuitry generates the depth information for the pixels in the different portions of the camera frame. In this manner, the example techniques may account for the scan time of the LiDAR frames, and how different portions of the camera frame may be closer in time to different LiDAR frames.

In scenarios where the vehicle is moving, the processing circuitry may determine the depth information by determining respective time differences between the camera frame timestamp and the respective LiDAR frame timestamps of the assigned LiDAR frames, and determining a speed of a vehicle that includes a camera used for capturing the camera frame and a LiDAR used for capturing the LiDAR frames. One or more sensors 208 may output the speed data. The processing circuitry may scale depth values from the assigned LiDAR frames based on the speed and the respective time differences, and generate the depth information for the pixels in the different portions of the camera frame based on the scaled depth values of the assigned LiDAR frames.

Additionally, the processing circuitry may access timing information of when the different portions of the camera frame are captured based on a rolling shutter of camera 202B that captured the camera frame. The processing circuitry assigns, at a pixel-level, different pixels of the camera frame to different LiDAR frames based on the camera frame timestamp and respective LiDAR frame timestamps of the different LiDAR frames, the capture angle of the different portions of the camera frame, and the timing information. In this manner, the depth information is accurately aligned with the image content, even within a single camera frame.

The above example techniques may improve accuracy in depth information generation, enhanced synchronization between LiDAR and camera frames, and the ability to account for vehicle movement and rolling shutter effects. Overall, these improvements may lead to more reliable and precise depth information, which is useful for applications such as obstacle detection, path planning, and autonomous navigation. For example, the processing circuitry may be configured to control an operating parameter of a vehicle (e.g., vehicle 100) based on the depth information. Examples of the operating parameter include one of a braking parameter or a path planning parameter.

Figure 3:
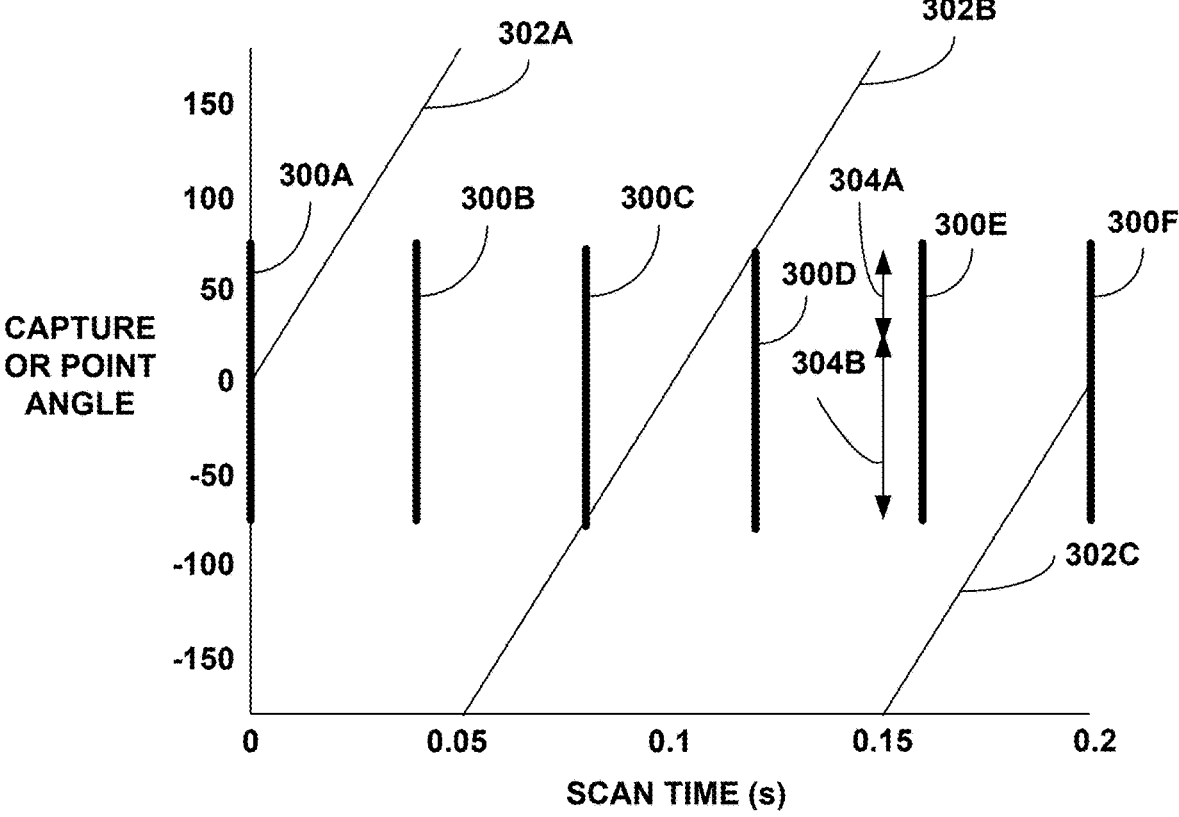
FIG. 3 is a conceptual diagram illustrating examples of capture times of camera frames and LiDAR frames.

FIG. 3 is a conceptual diagram illustrating examples of capture times of camera frames and LiDAR frames. FIG. 3 illustrates timing of when camera frames 300A-300F are captured. In the example of FIG. 3, the capture angle range of camera frames 300A-300F is approximately −75-degrees to +75-degrees. That is, the capture angle (e.g. yaw angle) of any portion within camera frames 300A-300F is between −75-degrees and +75-degrees. For example, each capture angle may be a column of camera frames 300A-300F. Each of camera frames 300A-300F may be associated with a camera frame timestamp. In some examples, the camera frames 300A-300F may be captured at approximately 25 Hz.

FIG. 3 also illustrates timing of when LiDAR frames 302A-302C are captured. As described, LiDAR frames are captured over a scan time. For instance, LiDAR frame 302B is captured from 0.05 second to 0.15 second (e.g., a scan time of 0.1 second). In this example, 0.1 second scan time may mean that the laser of the LiDAR took 0.1 second to make a full 360-degree rotation. At each time instance, the laser of the LiDAR may be at different point angles. For instance, for LiDAR frame 302B, at 0.05 seconds, the laser may be at −180-degrees, and at 0.15 second, the laser may be at +180-degrees making a full rotation.

Accordingly, in FIG. 3, one diagonal line over a scan time represents one LiDAR frame. The entire scan time for LiDAR frame 302B is illustrated in FIG. 3. For LiDAR frame 302A, the scan time from capturing points having point angles of −180-degrees to 0-degrees is not illustrated, and for LiDAR frame 302C, the scan time from capturing points having point angles of 0-degrees to +180-degrees is not illustrated.

In FIG. 3, the example timing of the camera frames 300A-300F and LiDAR frames 302A-302C may repeat at a common frame rate, such as 5 Hz. Also, the time difference of camera pixels to the nearest LiDAR frames varies spatially and temporally between camera frames. For example, in the example of FIG. 3, camera frame 300E is illustrated as having first portion 304A and second portion 304B. In FIG. 3, first portion 304A is defined by a first capture angle (e.g., a subrange between the capture angle range of −75-degrees to +75-degrees), and second portion 304B is defined by a second capture angle (e.g., a subrange between capture angle range of −75-degrees to +75-degrees).

The processing circuitry (e.g., of computing device 102 or 200) may determine a camera frame timestamp indicative of when camera frame 300E is captured. Camera frame 300E includes image content across a capture angle range (e.g., of −75-degrees to +75-degrees). The processing circuitry may also determine a plurality of LiDAR frame timestamps each indicative of when a respective LiDAR frame of a plurality of LiDAR frames 302A-302C is captured over a scan time.

The processing circuitry may assign different portions of the camera frame 300E to different LiDAR frames based on the camera frame timestamp and respective LiDAR frame timestamps of the different LiDAR frames and based on a capture angle of the different portions of the camera frame 300E. For example, based on timestamps, the processing circuitry may determine that LiDAR frames 302B and 302C are closest in time to camera frame 300E. However, for first portion 304A, based on the first capture angle of first portion 304A, LiDAR frame 302B may be closer in time than LiDAR frame 302C. For second portion 304B, based on the second capture angle of second portion 304B, LiDAR frame 302C may be closer in time than LiDAR frame 302B.

The processing circuitry may generate depth information for pixels in the different portions of the camera frame based on assigned LiDAR frames. For example, the processing circuitry may determine which points in LiDAR frame 302B correspond to pixels in the first portion 304A of camera frame 300E, and generate depth information for pixels in the first portion 304A based on depth values of the corresponding points in LiDAR frame 302B. Similarly, the processing circuitry may determine which points in LiDAR frame 302C correspond to pixels in the second portion 304B of camera frame 300E, and generate depth information for pixels in the second portion 304B based on depth values of the corresponding points in LiDAR frame 302C.

FIGS. 4A-4J illustrate example camera frames and assignment of different portions of the camera frame to different LiDAR frames to generate depth information. In the example of FIGS. 4A-4J, the camera frames may be captured using global shutter as if the entire camera frame is captured at a single instance. Examples with rolling shutter are described with respect to FIGS. 6A-6J.

Figures 4A, 4B, 4C, 4D, 4E, 4F, 4G, 4H, 4I, 4J:
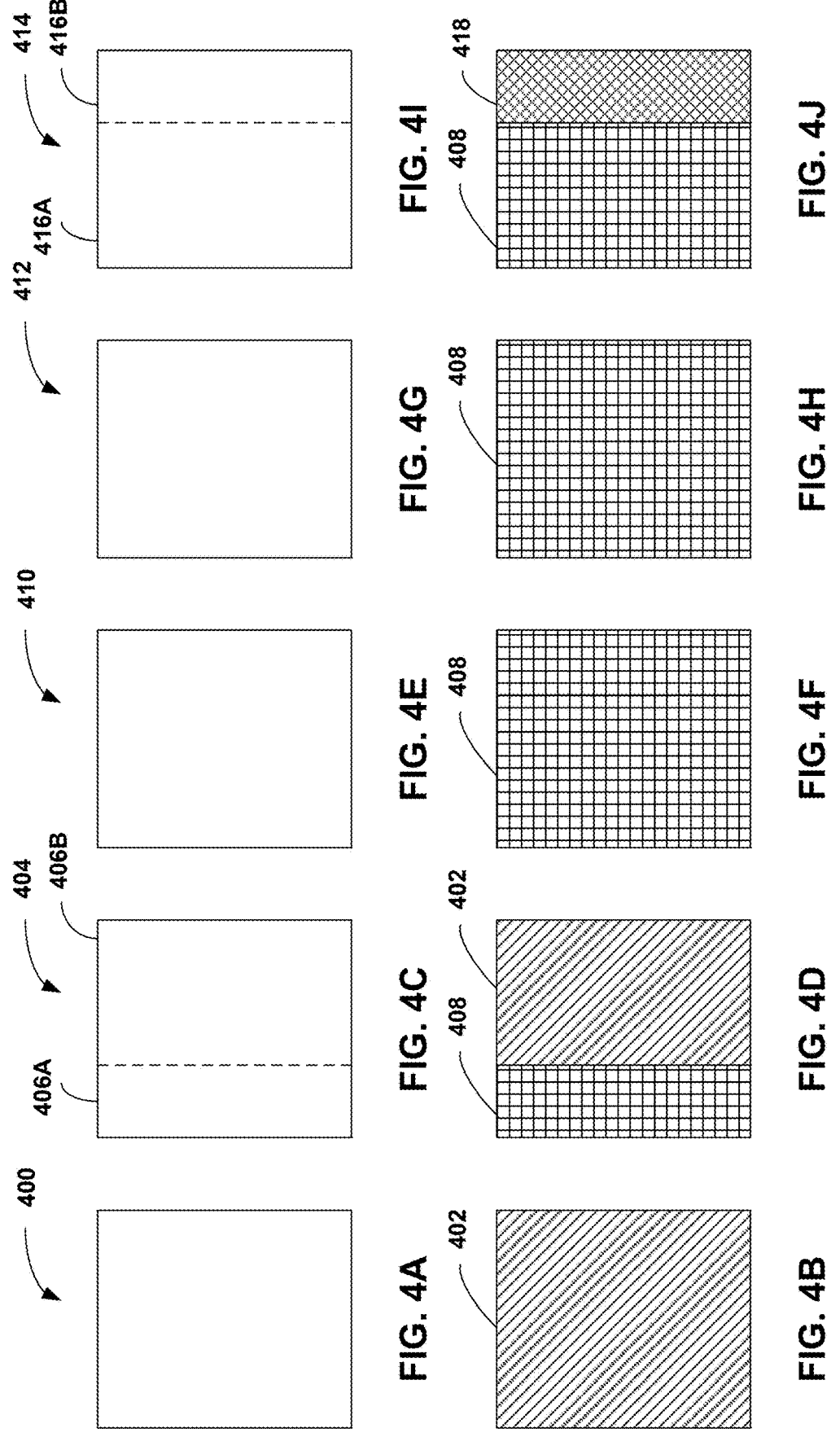
FIGS. 4A-4J illustrate example camera frames and assignment of different portions of the camera frame to different LiDAR frames to generate depth information.

FIG. 4A illustrates camera frame 400, and FIG. 4B illustrates that processing circuitry (e.g., any one or combination of camera processor 204, CPU 206, or GPU 210) generated the depth information for all pixels in camera frame 400 based on depth values of points in LiDAR frame 402. For instance, in FIGS. 4A and 4B, rather than assigning different portions of camera frame 400 to different LiDAR frames, the processing circuitry assigned the same LiDAR frame 402 to the entirety of camera frame 400.

FIG. 4C illustrates camera frame 404, which may be captured subsequent to camera frame 400. As illustrated in FIG. 4C, camera frame 400 includes first portion 406A and second portion 406B. FIG. 4D illustrates that processing circuitry generated the depth information for first portion 406A based on depth values of points in LiDAR frame 408, but generated the depth information for second portion 406B based on depth values of points in LiDAR frame 402.

For instance, first portion 406A may correspond to a first capture angle (e.g., a subrange of the full capture angle range of camera 202B). In this example, the processing circuitry may determine that first LiDAR frame 408 is closer in time to a first portion 406A of the different portions of the camera frame 404 than the second LiDAR frame 402 is to the first portion 406A based on a first capture angle of the first portion 406A, the camera frame timestamp of camera frame 404, and the first LiDAR frame timestamp of LiDAR frame 408.

Similarly, second portion 406B may correspond to a second capture angle (e.g., a subrange of the full capture angle range of camera 202B). In this example, the processing circuitry may determine that second LiDAR frame 402 is closer in time to a second portion 406B of the different portions of the camera frame 404 than the first LiDAR frame 408 is to the second portion 406B based on a second capture angle of the second portion 406B, the camera frame timestamp of camera frame 404, and the second LiDAR frame timestamp of LiDAR frame 402.

Accordingly, the processing circuitry may assign different portions of the camera frame 404 to different LiDAR frames (e.g., LiDAR frames 408 and 402) based on the camera frame timestamp of camera frame 404 and respective LiDAR frame timestamps of the different LiDAR frames 408 and 402 and based on a capture angle of the different portions of the camera frame. For instance, the processing circuitry may assign the first portion 406A to first LiDAR frame 408, and assign the second portion 406B to the second LiDAR frame 402. LiDAR frames 408 and 402 being assigned LiDAR frames in this example.

Stated another way, the processing circuitry may identify portions (e.g., columns) where the nearest LiDAR frame transitions from one frame to the next. That is, LiDAR frame 408 may be closest in time to first portion 406A, and LiDAR frame 402 may be closest in time to second portion 406B. The edge between first portion 406A and second portion 406B may represent the transition from LiDAR frame 408 to LIDAR frame 402.

The processing circuitry may generate depth information for pixels in the different portions of the camera frame 404 based on assigned LiDAR frames 408 and 402. For example, the processing circuitry may generate depth information for pixels in the first portion 406A based on depth information from the first LiDAR frame 408, and generate depth information for pixels in the second portion 406B based on depth information from the second LiDAR frame 402. As an example, the processing circuitry may determine which points in the assigned LiDAR frames correspond to which pixels in the camera frame based on capture angles of the pixels and point angles of the points in the assigned LiDAR frames. For instance, the processing circuitry may determine which points in LiDAR frame 408 correspond to which pixels in first portion 406A based on capture angle of pixels in first portion 406A and point angles of the points in LiDAR frame 408. The processing circuitry may determine which points in LiDAR frame 402 correspond to which pixels in second portion 406B based on capture angle of pixels in second portion 406B and point angles of the points in LiDAR frame 402.

The processing circuitry may determine depth values for the points in the assigned LiDAR frames 408 and 402. The processing circuitry may generate the depth information for the pixels in the different portions of the camera frame 404 based on the determined depth values for the points in the assigned LiDAR frames and the correspondence of the points in the assigned LiDAR frames 408 and 402 and the pixels in the camera frame 404. In some examples, the processing circuitry may perform interpolation between depth values of first LiDAR frame 408 and second LiDAR frame 402 near the transition.

In some examples, LiDAR frame 408 may be captured after camera frame 404 (e.g., next LiDAR frame), and LiDAR frame 402 may be captured before camera frame 404 (e.g., previous LiDAR frame). To determine the depth values, the processing circuitry may generate a new LiDAR frame in which points from LiDAR frame 408 assigned to first portion 406A are included, and points from LiDAR frame 402 assigned to second portion 406B are included. The processing circuitry may perform interpolation of the values to achieve smoother transitions and better alignment from switching from LiDAR frame 408 to LiDAR frame 402.

FIG. 4E illustrates camera frame 410, which may be captured subsequent to camera frame 404, and FIG. 4F illustrates that processing circuitry generated the depth information for all pixels in camera frame 410 based on depth values of points in LiDAR frame 408. For instance, in FIGS. 4E and 4F, rather than assigning different portions of camera frame 410 to different LiDAR frames, the processing circuitry assigned the same LiDAR frame 408 to the entirety of camera frame 410.

FIG. 4G illustrates camera frame 412, which may be captured subsequent to camera frame 410, and FIG. 4H illustrates that processing circuitry generated the depth information for all pixels in camera frame 412 based on depth values of points in LiDAR frame 408. For instance, in FIGS. 4G and 4H, rather than assigning different portions of camera frame 412 to different LiDAR frames, the processing circuitry assigned the same LiDAR frame 408 to the entirety of camera frame 412.

FIG. 4I illustrates camera frame 414, which may be captured subsequent to camera frame 412. As illustrated in FIG. 4I, camera frame 414 includes first portion 416A and second portion 416B. FIG. 4J illustrates that processing circuitry generated the depth information for first portion 416A based on depth values of points in LiDAR frame 408, but generated the depth information for second portion 416B based on depth values of points in LiDAR frame 418.

First portion 416A may correspond to a first capture angle (e.g., a subrange of the full capture angle range of camera 202B), and may be closer in time to LiDAR frame 408 than LiDAR frame 418 based on a first capture angle of the first portion 416A, the camera frame timestamp of camera frame 414, and the LiDAR frame timestamp of LiDAR frame 408. Second portion 416B may correspond to a second capture angle (e.g., a subrange of the full capture angle range of camera 202B), and may be closer in time to LiDAR frame 418 than LiDAR frame 408 based on a second capture angle of the second portion 406B, the camera frame timestamp of camera frame 414, and the LiDAR frame timestamp of LiDAR frame 418.

Accordingly, the processing circuitry may assign different portions of the camera frame 414 to different LiDAR frames (e.g., LiDAR frames 408 and 418) based on the camera frame timestamp of camera frame 414 and respective LiDAR frame timestamps of the different LiDAR frames 408 and 418 and based on a capture angle of the different portions of the camera frame. For instance, the processing circuitry may assign the first portion 416A to LiDAR frame 408, and assign the second portion 416B to the LiDAR frame 418. LiDAR frames 408 and 418 being assigned LiDAR frames in this example.

Stated another way, the processing circuitry may identify portions (e.g., columns) where the nearest LiDAR frame transitions from one frame to the next. That is, LiDAR frame 408 may be closest in time to first portion 416A, and LiDAR frame 418 may be closest in time to second portion 416B. The edge between first portion 416A and second portion 416B may represent the transition from LiDAR frame 408 to LiDAR frame 418.

The processing circuitry may generate depth information for pixels in the different portions of the camera frame 414 based on assigned LiDAR frames 408 and 418. For example, the processing circuitry may generate depth information for pixels in the first portion 416A based on depth information from the LiDAR frame 408, and generate depth information for pixels in the second portion 416B based on depth information from the LiDAR frame 418. As an example, the processing circuitry may determine which points in the assigned LiDAR frames correspond to which pixels in the camera frame based on capture angles of the pixels and point angles of the points in the assigned LiDAR frames. For instance, the processing circuitry may determine which points in LiDAR frame 408 correspond to which pixels in first portion 416A based on capture angle of pixels in first portion 416A and point angles of the points in LiDAR frame 408. The processing circuitry may determine which points in LiDAR frame 418 correspond to which pixels in second portion 416B based on capture angle of pixels in second portion 416B and point angles of the points in LiDAR frame 418.

The processing circuitry may determine depth values for the points in the assigned LiDAR frames 408 and 418. The processing circuitry may generate the depth information for the pixels in the different portions of the camera frame 414 based on the determined depth values for the points in the assigned LiDAR frames and the correspondence of the points in the assigned LiDAR frames 408 and 418 and the pixels in the camera frame 414. In some examples, the processing circuitry may perform interpolation between depth values of LiDAR frame 408 and LiDAR frame 418 near the transition.

In some examples, LiDAR frame 418 may be captured after camera frame 414 (e.g., next LiDAR frame), and LiDAR frame 418 may be captured before camera frame 414 (e.g., previous LiDAR frame). To determine the depth values, the processing circuitry may generate a new LiDAR frame in which points from LiDAR frame 408 assigned to first portion 416A are included, and points from LiDAR frame 418 assigned to second portion 416B are included. The processing circuitry may perform interpolation of the values to achieve smoother transitions and better alignment from switching from LiDAR frame 408 to LiDAR frame 418.

Figures 5A, 5B:
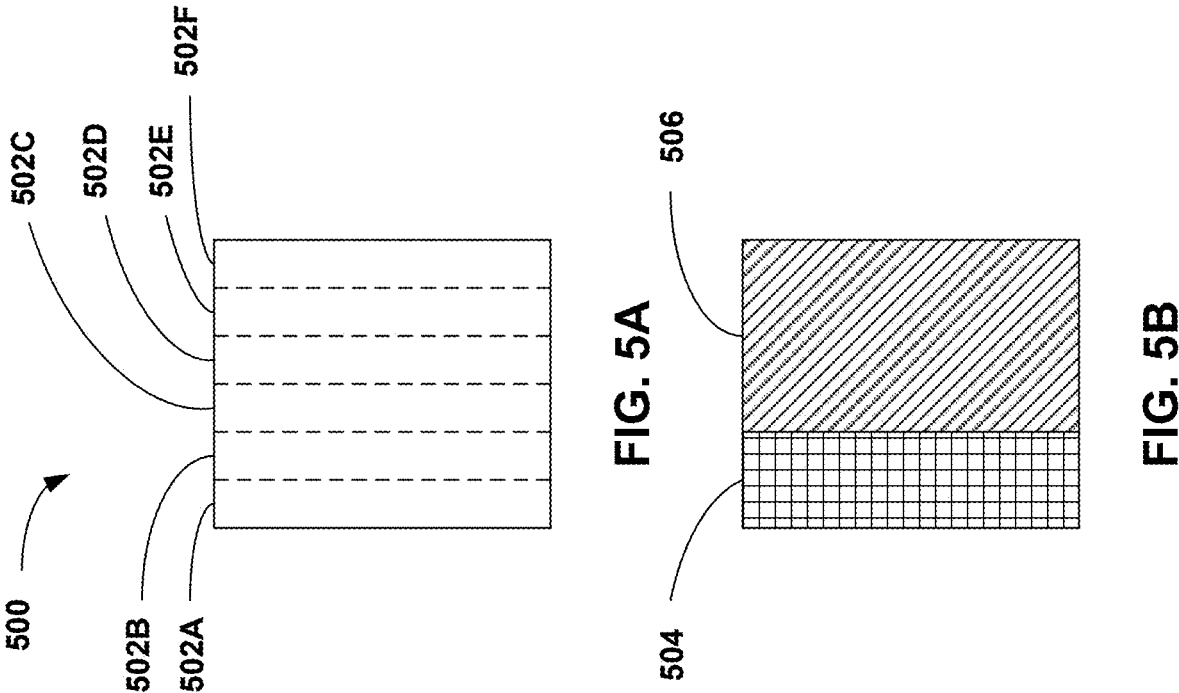
FIGS. 5A and 5B illustrate example column level adjustment of depth information.

FIGS. 5A and 5B illustrate example column level adjustment of depth information. For instance, the examples of FIGS. 5A and 5B illustrate ways in which to align LiDAR points with each column of a camera frame by compensating for a motion of a vehicle.

The example techniques described with respect to FIGS. 5A and 5B may be performed with respect to camera frames 400, 410, and 412 where depth information for all pixels in camera frames 400, 410, and 412 are determined from a same LiDAR frame (e.g., LiDAR frame 402 for camera frame 400 and LiDAR frame 408 for camera frames 410 and 412). The example techniques described with respect to FIGS. 5A and 5B may be performed with respect to camera frames 404 and 414 where depth information for pixels in different portions camera frames 404 and 414 are determined from different LiDAR frames (e.g., LiDAR frames 408 and 402 for camera frame 404 and LiDAR frames 408 and 418 for camera frame 414).

For instance, FIG. 5A illustrates camera frame 500 that includes portions 502A-502F. As illustrated in FIG. 5B, the processing circuitry may assign different portions 502A-502F of the camera frame 500 to different LiDAR frames 504 or 506 based on the camera frame timestamp of camera frame 500 and respective LiDAR frame timestamps of the different LiDAR frames 504 and 506 and based on a capture angle of the different portions 502A-502F of the camera frame 500. LiDAR frames 504 and 506 being assigned LiDAR frames in this example.

In FIGS. 5A and 5B, the processing circuitry may determine which points in the assigned LiDAR frames 504 and 506 correspond to which pixels in the camera frame 500 based on capture angles of the pixels and point angles of the points in the assigned LiDAR frames 504 and 506. The processing circuitry may determine depth values for the points in the assigned LiDAR frames 504 and 506, and generate the depth information for the pixels in the different portions 502A-502B of the camera frame 500 based on the determined depth values for the points in the assigned LiDAR frames 504 and 506 and the correspondence of the points in the assigned LiDAR frames 504 and 506 and the pixels in the camera frame 500.

In some examples, rather than setting the depth values of points in LiDAR frame 504 as the depth information for corresponding pixels in portions 502A and 502B, and setting the depth values of points in LiDAR frame 506 as the depth information for corresponding pixels in portions 502C-502F, the processing circuitry may utilize information indicative of how much the vehicle traveled to scale the depth values. As an example, the processing circuitry may determine respective time differences between the camera frame timestamp of camera frame 500 and the respective LiDAR frame timestamps of the assigned LiDAR frames 504 and 506. The processing circuitry may determine a speed of a vehicle that includes a camera used for capturing the camera frame 500 and a LiDAR used for capturing the LiDAR frames 504 and

506 (e.g., based on one or more sensors 208). The difference in the timestamps multiplied by the speed may indicate a distance traveled. The processing circuitry may scale depth values from the assigned LiDAR frames 504 and 506 based on the speed and the respective time differences. That is the processing circuitry may scale the depth values of points in LiDAR frames 504 and 506 that correspond to pixels in portions 502A-502F. The processing circuitry generate the depth information for the pixels in the different portions 502A-502F of the camera frame 500 based on the scaled depth values of the assigned LiDAR frames 504 and 506.

In some examples, the processing circuitry may repeat such operations on a per column basis of camera frame 500. For instance, each of portions 502A-502F may be one column of pixels in camera frame 500, and may correspond to one capture angle. As an example, portion 502A may have a first capture angle, portion 502B may have a second capture angle, and so forth.

Accordingly, in some examples, to generate the depth information for the pixels in the different portions 502A-502F of the camera frame 500 based on the scaled depth values of the assigned LiDAR frames 504 and 506, the processing circuitry may be configured to generate depth information for a first column of pixels (e.g., portion 502A) in the camera frame based on scaled depth values of a first LiDAR frame 504 assigned to the first column of pixels. The processing circuitry may generate depth information for a second column of pixels (e.g., portion 502C) in the camera frame based on scaled depth values of a second LiDAR frame 506 assigned to the second column of pixels. In this example, the first column and the second column correspond to different capture angles.

As another example, to generate the depth information for the pixels in the different portions 502A-502F of the camera frame 500 based on the scaled depth values of the assigned LiDAR frames 504 and 506, the processing circuitry may be configured to generate depth information for a first column of pixels (e.g., portion 502A) in the camera frame based on scaled depth values of points of LiDAR frame 504 assigned to the first column of pixels. The processing circuitry may generate depth information for a second column of pixels (e.g., portion 502B) in the camera frame based on scaled depth values of points of LiDAR frame 504 assigned to the second column of pixels. In this example, the first column and the second column correspond to different capture angles.

Similar to the description with respect to FIG. 3, LiDAR frame 504 may be captured over a scan time, and LiDAR frame 506 may be captured over a scan time. Therefore, the points in LiDAR frame 504 may be captured at different times, and the points in LiDAR frame 506 may be captured at different times. Accordingly, each point may be associated with a timestamp. In some examples, the processing circuitry may utilize the times when the points in LiDAR frame 504 and LiDAR frame 506 were captured to scale the depth values. For example, as described above, the processing circuitry may determine respective time differences between the camera frame timestamp of camera frame 500 and the respective LiDAR frame timestamps of the assigned LiDAR frames 504 and 506. Determining respective time differences between the camera frame timestamp of camera frame 500 and the respective LiDAR frame timestamps of the assigned LiDAR frames 504 and 506 may include determining differences in the timestamps of the points in LiDAR frames 504 and 506 and the timestamp of camera frame 500.

In this manner, the processing circuitry may perform compensation on a column basis (e.g., via portions 502A-

502F). For instance, the processing circuitry may adjust position of the LiDAR points (e.g., scale the depth values of points in LiDAR frames 504 or 506) for each of portions 502A-502F based on a time difference between capture of a LiDAR point (e.g., timestamp of the point) and camera frame timestamp. The adjustment may be performed for each of portions 502A-502F independently considering the time difference between the timestamps of the points and the camera frame timestamp.

In some examples, the roll angle difference between the camera used for capturing camera frame 500 and the LiDAR laser used for capturing LiDAR frames 504 and 506 may be minimal. For example, as illustrated in FIG. 1, camera 102B and LiDAR 102A are pointed in the same direction, and may not move differently relative to each other (e.g., the amount that camera 102B moves forward is the same as the amount by which LiDAR 102A moves forward).

FIGS. 6A-6J illustrate additional example camera frames and assignment of different portions of the camera frame to different LiDAR frames to generate depth information. The processing circuitry (e.g., any one or combination of camera processor 204, CPU 206, or GPU 210) may be configured to perform the example techniques of FIGS. 6A-6J when camera 202B or 104B include rolling shutter. In some examples, even if rolling shutter is enabled, the processing circuitry may not perform the example of FIGS. 6A-6J, and perform the operations of FIGS. 4A-4J. Also, the processing circuitry may perform the example techniques of FIGS. 5A and 5B and the example techniques of FIGS. 6A-6J, or may perform the example techniques of FIGS. 6A-6J without necessarily performing the example techniques of FIGS. 5A and 5B.

With rolling shutter, a row or column of photodiodes on a sensor of camera 202B or 104B may be exposed at different times. Therefore, camera 202B or 104B may capture image content on a row-by-row or column-by-column basis and at different times. Stated another way, pixels in a row or column of a camera frame may be captured at a different time than pixels in another row or column of the same camera frame. Because the pixels in the camera frame are captured at different times, and the vehicle (e.g., vehicle 100) may be moving, in some examples, the timing information of the rolling shutter may impact which one of the LiDAR frames is assigned to which pixel in the camera frame.

For instance, in FIGS. 4A-4J, the various portions are illustrated as a plurality of columns, and the processing circuitry may determine intra-frame transition between which LiDAR frames to assign the portions. In FIGS. 5A and 5B, the various portions are illustrated as a column, and the processing circuitry may perform column-level updates to the depth information based on speed at which vehicle 100 is moving. In FIGS. 6A-6J, the various portions may be a pixel-level, and the processing circuitry may determine at a pixel level which LiDAR frame to assign to which pixel based on LiDAR frame timestamps, capture angle, and timing information of the rolling shutter (e.g., timing of when a pixel was captured). Accordingly, as illustrated in FIGS. 6C and 6I, a portion of a camera frame may not be a vertical column, but instead along a diagonal because different rows in the camera frames are captured at different times. That is, in addition to the camera frame timestamp, the timing information of the rolling shutter may control which LiDAR frames are assigned to which portions of a camera frame.

FIG. 6A illustrates camera frame 600, and FIG. 6B illustrates that processing circuitry (e.g., any one or combination of camera processor 204, CPU 206, or GPU 210) generated the depth information for all pixels in camera frame 600 based on depth values of points in LiDAR frame 602. For instance, in FIGS. 6A and 6B, rather than assigning different portions of camera frame 600 to different LiDAR frames, the processing circuitry assigned the same LiDAR frame 602 to the entirety of camera frame 600. The same may also occur from camera frames 610 and 612, where the processing circuitry assigned the same LiDAR frame 608 to entirety of camera frame 610 and camera frame 612.

FIG. 6C illustrates camera frame 604, which may be captured subsequent to camera frame 600. As illustrated in FIG. 6C, camera frame 604 includes first portion 606A and second portion 606B. FIG. 6D illustrates that processing circuitry generated the depth information for first portion 606A based on depth values of points in LiDAR frame 608, but generated the depth information for second portion 606B based on depth values of points in LiDAR frame 602.

As an example, the processing circuitry may access timing information of when the different portions of the camera frame 604 are captured based on a rolling shutter of a camera 202B or 104B that captured the camera frame 604. The timing information may be stored on camera 202B or 104B, or may be set by camera processor 204. To assign different portions 606A and 606B of the camera frame 600 to different LiDAR frames 608 and 602, the processing circuitry may be configured to assign, at a pixel-level, different pixels of the camera frame 604 to different LiDAR frames 608 and 602 based on the camera frame timestamp and respective LiDAR frame timestamps of the different LiDAR frames 608 and 602, the capture angle of the different portions 606A and 606B of the camera frame, and the timing information.

As an example, camera frame 604 includes pixel row 620A and pixel row 620B that were captured at different times due to the rolling shutter. In this example, more pixels of pixel row 620A are part of first portion 606A than pixels of pixel row 620B are part of first portion 606B. First portion 606A may include more pixels from pixel row 620A than pixel row 620B due to the movement of the vehicle from when image content of pixel row 620A was captured compared to when image content of pixel row 620B was captured. In this example, the capture angle of the pixels in the same column in pixel row 620A and pixel row 620B may be the same capture angle, but the pixels in the same column in pixel row 620A and pixel row 620B may be assigned different LiDAR frames 608 and 602 due to the movement of vehicle 100 and due to rolling shutter.

For instance, first portion 606A may correspond to a first capture angle (e.g., a subrange of the full capture angle range of camera 202B). In this example, the processing circuitry may determine that first LiDAR frame 608 is closer in time to a first portion 606A of the different portions of the camera frame 604 than the second LiDAR frame 602 is to the first portion 606A based on a first capture angle of the first portion 606A, the camera frame timestamp of camera frame 604, the first LiDAR frame timestamp of LiDAR frame 608, and the timing information of the rolling shutter.

Similarly, second portion 606B may correspond to a second capture angle (e.g., a subrange of the full capture angle range of camera 202B). In this example, the processing circuitry may determine that second LiDAR frame 602 is closer in time to a second portion 606B of the different portions of the camera frame 604 than the first LiDAR frame 608 is to the second portion 606B based on a second capture angle of the second portion 606B, the camera frame timestamp of camera frame 604, the second LiDAR frame timestamp of LiDAR frame 602, and the timing information of the rolling shutter.

Accordingly, the processing circuitry may assign different portions of the camera frame 604 to different LiDAR frames (e.g., LiDAR frames 608 and 602) based on the camera frame timestamp of camera frame 604 and respective LiDAR frame timestamps of the different LiDAR frames 608 and 602 and based on a capture angle of the different portions of the camera frame, as well as the timing information of the rolling shutter. For instance, the processing circuitry may assign the first portion 606A to first LiDAR frame 608, and assign the second portion 606B to the second LiDAR frame 602. LiDAR frames 608 and 602 being assigned LiDAR frames in this example.

The processing circuitry may generate depth information for pixels in the different portions of the camera frame 604 based on assigned LiDAR frames 608 and 602. For example, the processing circuitry may generate depth information for pixels in the first portion 606A based on depth information from the first LiDAR frame 608, and generate depth information for pixels in the second portion 606B based on depth information from the second LiDAR frame 602. As an example, the processing circuitry may determine which points in the assigned LiDAR frames correspond to which pixels in the camera frame based on capture angles of the pixels and point angles of the points in the assigned LiDAR frames. For instance, the processing circuitry may determine which points in LiDAR frame 608 correspond to which pixels in first portion 606A based on capture angle of pixels in first portion 606A and point angles of the points in LiDAR frame 608. The processing circuitry may determine which points in LiDAR frame 602 correspond to which pixels in second portion 606B based on capture angle of pixels in second portion 606B and point angles of the points in LiDAR frame 602.

The processing circuitry may determine depth values for the points in the assigned LiDAR frames 608 and 602. The processing circuitry may generate the depth information for the pixels in the different portions of the camera frame 604 based on the determined depth values for the points in the assigned LiDAR frames and the correspondence of the points in the assigned LiDAR frames 608 and 602 and the pixels in the camera frame 604.

FIG. 6I illustrates camera frame 614, which may be captured subsequent to camera frame 612. As illustrated in FIG. 6I, camera frame 614 includes first portion 616A and second portion 616B. FIG. 6J illustrates that processing circuitry generated the depth information for first portion 616A based on depth values of points in LiDAR frame 608, but generated the depth information for second portion 616B based on depth values of points in LiDAR frame 618.

As an example, the processing circuitry may access timing information of when the different portions of the camera frame 614 are captured based on a rolling shutter of a camera 202B or 104B that captured the camera frame 614. To assign different portions 616A and 616B of the camera frame 614 to different LiDAR frames 608 and 618, the processing circuitry may be configured to assign, at a pixel-level, different pixels of the camera frame 614 to different LiDAR frames 608 and 618 based on the camera frame timestamp and respective LiDAR frame timestamps of the different LiDAR frames 608 and 618, the capture angle of the different portions 616A and 616B of the camera frame, and the timing information.

As an example, camera frame 614 includes pixel row 622A and pixel row 622B that were captured at different times due to the rolling shutter. In this example, more pixels of pixel row 622A are part of first portion 616A than pixels of pixel row 622B are part of second portion 616B. First portion 616A may include more pixels from pixel row 622A than pixel row 622B due to the movement of the vehicle from when image content of pixel row 622A was captured compared to when image content of pixel row 622B was captured. In this example, the capture angle of the pixels in the same column in pixel row 622A and pixel row 622B may be the same capture angle, but the pixels in the same column in pixel row 622A and pixel row 622B may be assigned different LiDAR frames 608 and 618 due to the movement of vehicle 100 and due to rolling shutter.

In the example of FIGS. 6A-6I, similar to above, the processing circuitry may identify the nearest LiDAR frames (e.g., including previous LiDAR frame and next LiDAR frame). For example, for camera frame 614, the nearest LiDAR frame to portion 616A may be LiDAR frame 608 (e.g., a previous LiDAR frame captured before camera frame 614), and the nearest LiDAR frame to portion 616B may be LiDAR frame 618 (e.g., next LiDAR frame captured after camera frame 614).

In the examples of FIGS. 6A-6I, the rolling shutter timing information is also utilized to determine the nearest LiDAR frame. Accordingly, in FIGS. 6C, 6D, 6I, and 6J, the depth information generation is performed at a pixel level by determining depth values accounting for the difference in when a LiDAR point is captured (e.g., timestamp of a point) and the capture time of each pixel (e.g., based on the timing information of the rolling shutter).

FIG. 7 is a flowchart illustrating a method of image processing according to one or more example techniques described in this disclosure. The example of FIG. 7 is described with respect to processing circuitry, examples of which include processing circuitry of computing device 102, or any one or combination of camera processor 204, CPU 206, and GPU 210, or other circuitry of computing device 200.

The processing circuitry may determine a camera frame timestamp indicative of when a camera frame is captured, the camera frame including image content across a capture angle range (700). For example, camera 104B or camera 202B may capture the camera frame. The processing circuitry may determine the timestamp of the camera frame. The capture angle range may refer to the FOV of camera 104B or camera 202B may indicate a yaw angle range of the image content that is captured by camera 104B or camera 202B.

Within a camera frame, each of the pixels may be associated with a capture angle (e.g., yaw angle). For instance, the pixels in the left most column of the camera frame may have a capture angle of −75-degrees, and the pixels in the right most column of the camera frame may have a capture angle of +75-degrees, if the FOV is 150-degrees. The pixels in the center column of the camera frame may have a capture angle of 0-degrees.

The processing circuitry may determine a plurality of LiDAR frame timestamps, each indicative of when a respective LiDAR frame of a plurality of LiDAR frames is captured over a scan time (702). For example, LiDAR 102A or LiDAR 202A may include a laser that rotates, and periodically outputs a laser pulse that reflects off of an object. Each laser pulse output may correspond to a point in a LiDAR frame. For example, the LiDAR frame may be a 3D point cloud with sparsely populated points. Each of the points may be associated with a point angle (e.g., yaw angle of the laser) and a depth value indicative of the relative depth of the point from the laser. For example, LiDAR 102A or LiDAR 202A may determine the amount of time it takes for the laser pulse to reflect back as a way to determine the depth of the point from the laser.

The scan time refers to the amount of time it takes the laser to make one full 360-degree rotation. Each of the LiDAR frames may include points determined during one rotation of the laser. For instance, a first LiDAR frame may include points determined from one full rotation of the laser, a second LiDAR frame may include points determined from another full rotation of the laser, and so forth. The laser may complete the rotation in the scan time.

The LiDAR frame timestamp may refer to a time of when the LiDAR frame was captured. Although the LiDAR frame may be captured over a scan time, the LiDAR frame timestamp may indicate an order in the which the LiDAR frames were captured. In some examples, the LiDAR frame timestamp may be time at the beginning of the rotation of the laser or the ending of the rotation of the laser. However, other examples of timestamps are possible as well. As an example, the processing circuitry may determine a first LiDAR frame timestamp indicative of when a first LiDAR frame is captured and a second LiDAR frame timestamp indicative of when a second LiDAR frame is captured.

The processing circuitry may assign different portions of the camera frame to different LiDAR frames based on the camera frame timestamp and respective LiDAR frame timestamps of the different LiDAR frames, and based on a capture angle of the different portions of the camera frame, the different LiDAR frames to which the different portions of the camera frame are assigned being assigned LiDAR frames (704). In this manner, the processing circuitry may ensure that each portion of the camera frame is matched with the most temporally and spatially relevant LiDAR frame. For instance, the processing circuitry may determine that for a first portion of the camera frame, the first LiDAR frame is closer in time to the first portion than the second LiDAR frame based on a first capture angle of the first portion, the camera frame timestamp, and the first LiDAR frame timestamp. The processing circuitry may assign the first portion to the first LiDAR frame. Similarly, the processing circuitry may determine that for a second portion of the camera frame, the second LiDAR frame is closer in time to the second portion than the first LiDAR frame based on a second capture angle of the second portion, the camera frame timestamp, and the second LiDAR frame timestamp. The processing circuitry may assign the second portion to the second LiDAR frame.

The processing circuitry may generate the depth information for the pixels in the different portions of the camera frame based on the assigned LiDAR frames (706). For example, the processing circuitry generates depth information for pixels in the first portion based on depth information from the first LiDAR frame, and generates depth information for pixels in the second portion based on depth information from the second LiDAR frame.

As one example, to generate the depth information, the processing circuitry may be configured to determine which points in the assigned LiDAR frames correspond to which pixels in the camera frame based on capture angles of the pixels and point angles of the points in the assigned LiDAR frames. The processing circuitry may determine depth values for the points in the assigned LiDAR frames, and generate the depth information for the pixels in the different portions of the camera frame based on the determined depth values for the points in the assigned LiDAR frames and the correspondence of the points in the assigned LiDAR frames and the pixels in the camera frame.

To compensate for a moving vehicle, the processing circuitry may adjust for the distance traveled from when the camera frame and the LiDAR frames were captured. For instance, the processing circuitry may determine respective time differences between the camera frame timestamp and the respective LiDAR frame timestamps of the assigned LiDAR frames. The respective LiDAR frame timestamps of the assigned LiDAR frames may be the timestamps for when each of the points in the LiDAR frame were generated. The processing circuitry (e.g., based on one or more sensors 208) may determine a speed of a vehicle that includes a camera used for capturing the camera frame and a LiDAR used for capturing the LiDAR frames. The processing circuitry may scale depth values from the assigned LiDAR frames based on the speed and the respective time differences, and generate the depth information for the pixels in the different portions of the camera frame based on the scaled depth values of the assigned LiDAR frames.

As one example, LiDAR frames may be generated by sweeping the entire 360°. That is, each LiDAR scan may last about 0.1 seconds at 10 Hz frequency. Assuming the LiDAR starts the scan at 0°, the 359° and 0° has a difference in time of about 0.1 seconds. In this example, for each camera column there is the delta time difference between the capture time and timestamp assigned to the camera frame because the camera depth may always be considered at a single timestamp no matter how long it took for the LiDAR to rotate and capture the depth of each position. This dt (e.g., delta time difference) along with the known velocity is used to modify the depth such that final_Depth=captured_depth+ delta depth where, delta depth is velocity*dt.

For instance, similar to the description of FIGS. 5A and 5B, to generate the depth information for the pixels in the different portions of the camera frame based on the scaled depth values of the assigned LiDAR frames, the processing circuitry may be configured to generate depth information for a first column of pixels in the camera frame based on scaled depth values of a first LiDAR frame assigned to the first column of pixels. The processing circuitry may generate depth information for a second column of pixels in the camera frame based on scaled depth values of a second LiDAR frame assigned to the second column of pixels. In this example, the first column and the second column correspond to different capture angles.

In some examples, the processing circuitry may be configured to account for the rolling shutter. For example, the processing circuitry may be configured to access timing information of when the different portions of the camera frame are captured based on a rolling shutter of a camera (e.g., camera 104B or camera 202B) that captured the camera frame. To assign different portions of the camera frame to different LiDAR frames, the processing circuitry may be configured to assign, at a pixel-level, different pixels of the camera frame to different LiDAR frames based on the camera frame timestamp and respective LiDAR frame timestamps of the different LiDAR frames, the capture angle of the different portions of the camera frame, and the timing information, as illustrated in FIGS. 6C, 6D, 6I, and 6J.

With the depth information, the processing circuitry may be configured to perform various actions. As one example, the processing circuitry may use the depth information for generating 3D visual content using a NeRF system. As another example, the processing circuitry may use the depth information for object detection, such as for autonomous vehicles or ADAS. As an example, the processing circuitry may be configured to control an operating parameter of a vehicle based on the depth information. Examples of the operating parameter may include one of a braking parameter or a path planning parameter.

The following describes one or more examples in accordance with the techniques described in this disclosure.

Clause 1. A device for generating depth information, the device comprising: one or more memories; and processing circuitry coupled to the one or more memories, wherein the processing circuitry is configured to: determine a camera frame timestamp indicative of when a camera frame is captured, the camera frame including image content across a capture angle range; determine a plurality of LiDAR frame timestamps each indicative of when a respective LiDAR frame of a plurality of LiDAR frames is captured over a scan time; assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

Clause 2. The device of clause 1, wherein to generate the depth information, the processing circuitry is configured to: determine which points in the assigned LiDAR frames correspond to which pixels in the camera frame based on capture angles of the pixels and point angles of the points in the assigned LiDAR frames; determine depth values for the points in the assigned LiDAR frames; and generate the depth information for the pixels in the different portions of the camera frame based on the determined depth values for the points in the assigned LiDAR frames and the correspondence of the points in the assigned LiDAR frames and the pixels in the camera frame.

Clause 3. The device of any of clauses 1 and 2, wherein to determine the plurality of LiDAR frame timestamps each indicative of when the respective LiDAR frame of the plurality of LiDAR frames is captured, the processing circuitry is configured to determine a first LiDAR frame timestamp indicative of when a first LiDAR frame is captured and a second LiDAR frame timestamp indicative of when a second LiDAR frame is captured, wherein to assign different portions of the camera frame to different LiDAR frames based on the camera frame timestamp and respective LiDAR frame timestamps of the different LiDAR frames and based on the capture angle of the different portions of the camera frame, the processing circuitry is configured to: determine that the first LiDAR frame is closer in time to a first portion of the different portions of the camera frame than the second LiDAR frame is to the first portion based on a first capture angle of the first portion, the camera frame timestamp, and the first LiDAR frame timestamp; assign the first portion to the first LiDAR frame; determine that the second LiDAR frame is closer in time to a second portion of the different portions of the camera frame than the first LiDAR frame is to the second portion based on a second capture angle of the second portion, the camera frame timestamp, and the second LiDAR frame timestamp; and assign the second portion to the second LiDAR frame, and wherein to generate the depth information for the pixels in the different portions of the camera frame based on the assigned LiDAR frames, the processing circuitry is configured to generate depth information for pixels in the first portion based on depth information from the first LiDAR frame, and generate depth information for pixels in the second portion based on depth information from the second LiDAR frame.

Clause 4. The device of any of clauses 1-3, wherein to generate the depth information, the processing circuitry is configured to: determine respective time differences between the camera frame timestamp and the respective LiDAR frame timestamps of the assigned LiDAR frames; determine a speed of a vehicle that includes a camera used for capturing the camera frame and a LiDAR used for capturing the LiDAR frames; scale depth values from the assigned LiDAR frames based on the speed and the respective time differences; and generate the depth information for the pixels in the different portions of the camera frame based on the scaled depth values of the assigned LiDAR frames.

Clause 5. The device of clause 4, wherein to generate the depth information for the pixels in the different portions of the camera frame based on the scaled depth values of the assigned LiDAR frames, the processing circuitry is configured to: generate depth information for a first column of pixels in the camera frame based on scaled depth values of a first LiDAR frame assigned to the first column of pixels; and generate depth information for a second column of pixels in the camera frame based on scaled depth values of a second LiDAR frame assigned to the second column of pixels, wherein the first column and the second column correspond to different capture angles.

Clause 6. The device of any of clauses 1-5, wherein the processing circuitry is further configured to access timing information of when the different portions of the camera frame are captured based on a rolling shutter of a camera that captured the camera frame, and wherein to assign different portions of the camera frame to different LiDAR frames, the processing circuitry is configured to assign, at a pixel-level, different pixels of the camera frame to different LiDAR frames based on the camera frame timestamp and respective LiDAR frame timestamps of the different LiDAR frames, the capture angle of the different portions of the camera frame, and the timing information.

Clause 7. The device of any of clauses 1-6, wherein the capture angle range is a yaw angle range, and the capture angle is a yaw angle.

Clause 8. The device of any of clauses 1-7, wherein the processing circuitry is configured to control an operating parameter of a vehicle based on the depth information.

Clause 9. The device of clause 8, wherein the operating parameter comprises one of a braking parameter or a path planning parameter.

Clause 10. A method of generating depth information, the method comprising: determining a camera frame timestamp indicative of when a camera frame is captured, the camera frame including image content across a capture angle range; determining a plurality of LiDAR frame timestamps each indicative of when a respective LiDAR frame of a plurality of LiDAR frames is captured over a scan time; assigning different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generating depth information for pixels in the different portions of the camera frame based on the assigned LiDAR frames.

Clause 11. The method of clause 10, wherein generating the depth information comprises: determining which points in the assigned LiDAR frames correspond to which pixels in the camera frame based on capture angles of the pixels and point angles of the points in the assigned LiDAR frames; determining depth values for the points in the assigned LiDAR frames; and generating the depth information for the pixels in the different portions of the camera frame based on the determined depth values for the points in the assigned LiDAR frames and the correspondence of the points in the assigned LiDAR frames and the pixels in the camera frame.

Clause 12. The method of any of clauses 10 and 11, wherein determining the plurality of LiDAR frame time-stamps each indicative of when the respective LiDAR frame of the plurality of LiDAR frames is captured comprises determining a first LiDAR frame timestamp indicative of when a first LiDAR frame is captured and a second LiDAR frame timestamp indicative of when a second LiDAR frame is captured, wherein assigning different portions of the camera frame to different LiDAR frames based on the camera frame timestamp and respective LiDAR frame time-stamps of the different LiDAR frames and based on the capture angle of the different portions of the camera frame comprises: determining that the first LiDAR frame is closer in time to a first portion of the different portions of the camera frame than the second LiDAR frame is to the first portion based on a first capture angle of the first portion, the camera frame timestamp, and the first LiDAR frame time-stamp; assigning the first portion to the first LiDAR frame; determining that the second LiDAR frame is closer in time to a second portion of the different portions of the camera frame than the first LiDAR frame is to the second portion based on a second capture angle of the second portion, the camera frame timestamp, and the second LiDAR frame timestamp; and assigning the second portion to the second LiDAR frame, and wherein generating the depth informa-tion for the pixels in the different portions of the camera frame based on the assigned LiDAR frames comprises generating depth information for pixels in the first portion based on depth information from the first LiDAR frame, and generating depth information for pixels in the second portion based on depth information from the second LiDAR frame.

Clause 13. The method of any of clauses 10-12, wherein generating the depth information comprises: determining respective time differences between the camera frame time-stamp and the respective LiDAR frame timestamps of the assigned LiDAR frames; determining a speed of a vehicle that includes a camera used for capturing the camera frame and a LiDAR used for capturing the LiDAR frames; scaling depth values from the assigned LiDAR frames based on the speed and the respective time differences; and generating the depth information for the pixels in the different portions of the camera frame based on the scaled depth values of the assigned LiDAR frames.

Clause 14. The method of clause 13, wherein generating the depth information for the pixels in the different portions of the camera frame based on the scaled depth values of the assigned LiDAR frames comprises: generating depth infor-mation for a first column of pixels in the camera frame based on scaled depth values of a first LiDAR frame assigned to the first column of pixels; and generating depth information for a second column of pixels in the camera frame based on scaled depth values of a second LiDAR frame assigned to the second column of pixels, wherein the first column and the second column correspond to different capture angles.

Clause 15. The method of any of clauses 10-14, further comprising: accessing timing information of when the dif-ferent portions of the camera frame are captured based on a rolling shutter of a camera that captured the camera frame, wherein assigning different portions of the camera frame to different LiDAR frames comprises assigning, at a pixel-level, different pixels of the camera frame to different LiDAR frames based on the camera frame timestamp and respective LiDAR frame timestamps of the different LiDAR frames, the capture angle of the different portions of the camera frame, and the timing information.

Clause 16. The method of any of clauses 10-15, wherein the capture angle range is a yaw angle range, and the capture angle is a yaw angle.

Clause 17. The method of any of clauses 10-16, further comprising controlling an operating parameter of a vehicle based on the depth information.

Clause 18. The method of clause 17, wherein the operat-ing parameter comprises one of a braking parameter or a path planning parameter.

Clause 19. A computer-readable storage medium storing instructions thereon that when executed cause one or more processors to: determine a camera frame timestamp indica-tive of when a camera frame is captured, the camera frame including image content across a capture angle range; deter-mine a plurality of LiDAR frame timestamps each indicative of when a respective LiDAR frame of a plurality of LiDAR frames is captured over a scan time; assign different portions of the camera frame to different LiDAR frames based on the camera frame timestamp and respective LiDAR frame time-stamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

Clause 20. The computer-readable storage medium of clause 19, further comprising instructions that cause the one or more processors to perform the method of any of clauses 10-18.

In one or more examples, the functions described may be implemented in hardware, software, firmware, or any com-bination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for generating depth information, the device comprising:

one or more memories; and processing circuitry coupled to the one or more memories, wherein the processing circuitry is configured to:

determine a camera frame timestamp indicative of when a camera frame is captured, the camera frame including image content across a capture angle range;

determine a plurality of LiDAR frame timestamps each indicative of when a respective LiDAR frame of a plurality of LiDAR frames is captured over a scan time;

assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

2. The device of claim 1, wherein to generate the depth information, the processing circuitry is configured to:

determine which points in the assigned LiDAR frames correspond to which pixels in the camera frame based on capture angles of the pixels and point angles of the points in the assigned LiDAR frames;

determine depth values for the points in the assigned LiDAR frames; and generate the depth information for the pixels in the different portions of the camera frame based on the determined depth values for the points in the assigned LiDAR frames and the correspondence of the points in the assigned LiDAR frames and the pixels in the camera frame.

3. The device of claim 1, wherein to determine the plurality of LiDAR frame timestamps each indicative of when the respective LiDAR frame of the plurality of LiDAR frames is captured, the processing circuitry is configured to determine a first LiDAR frame timestamp indicative of when a first LiDAR frame is captured and a second LiDAR frame timestamp indicative of when a second LiDAR frame is captured, wherein to assign different portions of the camera frame to different LiDAR frames based on the camera frame timestamp and respective LiDAR frame timestamps of the different LiDAR frames and based on the capture angle of the different portions of the camera frame, the processing circuitry is configured to:

determine that the first LiDAR frame is closer in time to a first portion of the different portions of the camera frame than the second LiDAR frame is to the first portion based on a first capture angle of the first portion, the camera frame timestamp, and the first LiDAR frame timestamp;

assign the first portion to the first LiDAR frame;

determine that the second LiDAR frame is closer in time to a second portion of the different portions of the camera frame than the first LiDAR frame is to the second portion based on a second capture angle of the second portion, the camera frame timestamp, and the second LiDAR frame timestamp; and assign the second portion to the second LiDAR frame, and wherein to generate the depth information for the pixels in the different portions of the camera frame based on the assigned LiDAR frames, the processing circuitry is configured to generate depth information for pixels in the first portion based on depth information from the first LiDAR frame, and generate depth information for pixels in the second portion based on depth information from the second LiDAR frame.

4. The device of claim 1, wherein to generate the depth information, the processing circuitry is configured to:

determine respective time differences between the camera frame timestamp and the respective LiDAR frame timestamps of the assigned LiDAR frames;

determine a speed of a vehicle that includes a camera used for capturing the camera frame and a LiDAR used for capturing the LiDAR frames;

scale depth values from the assigned LiDAR frames based on the speed and the respective time differences; and generate the depth information for the pixels in the different portions of the camera frame based on the scaled depth values of the assigned LiDAR frames.

5. The device of claim 4, wherein to generate the depth information for the pixels in the different portions of the camera frame based on the scaled depth values of the assigned LiDAR frames, the processing circuitry is configured to:

generate depth information for a first column of pixels in the camera frame based on scaled depth values of a first LiDAR frame assigned to the first column of pixels; and generate depth information for a second column of pixels in the camera frame based on scaled depth values of a second LiDAR frame assigned to the second column of pixels, wherein the first column and the second column correspond to different capture angles.

6. The device of claim 1, wherein the processing circuitry is further configured to access timing information of when the different portions of the camera frame are captured based on a rolling shutter of a camera that captured the camera frame, and wherein to assign different portions of the camera frame to different LiDAR frames, the processing circuitry is configured to assign, at a pixel-level, different pixels of the camera frame to different LiDAR frames based on the camera frame timestamp and respective LiDAR frame timestamps of the different LiDAR frames, the capture angle of the different portions of the camera frame, and the timing information.

7. The device of claim 1, wherein the capture angle range is a yaw angle range, and the capture angle is a yaw angle.

8. The device of claim 1, wherein the processing circuitry is configured to control an operating parameter of a vehicle based on the depth information.

9. The device of claim 8, wherein the operating parameter comprises one of a braking parameter or a path planning parameter.

10. A method of generating depth information, the method comprising:

determining a camera frame timestamp indicative of when a camera frame is captured, the camera frame including image content across a capture angle range;

determining a plurality of LiDAR frame timestamps each indicative of when a respective LiDAR frame of a plurality of LiDAR frames is captured over a scan time;

assigning different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generating depth information for pixels in the different portions of the camera frame based on the assigned LiDAR frames.

11. The method of claim 10, wherein generating the depth information comprises:

determining which points in the assigned LiDAR frames correspond to which pixels in the camera frame based on capture angles of the pixels and point angles of the points in the assigned LiDAR frames;

determining depth values for the points in the assigned LiDAR frames; and generating the depth information for the pixels in the different portions of the camera frame based on the determined depth values for the points in the assigned LiDAR frames and the correspondence of the points in the assigned LiDAR frames and the pixels in the camera frame.

12. The method of claim 10, wherein determining the plurality of LiDAR frame timestamps each indicative of when the respective LiDAR frame of the plurality of LiDAR frames is captured comprises determining a first LiDAR frame timestamp indicative of when a first LiDAR frame is captured and a second LiDAR frame timestamp indicative of when a second LiDAR frame is captured, wherein assigning different portions of the camera frame to different LiDAR frames based on the camera frame timestamp and respective LiDAR frame timestamps of the different LiDAR frames and based on the capture angle of the different portions of the camera frame comprises:

determining that the first LiDAR frame is closer in time to a first portion of the different portions of the camera frame than the second LiDAR frame is to the first portion based on a first capture angle of the first portion, the camera frame timestamp, and the first LiDAR frame timestamp;

assigning the first portion to the first LiDAR frame;

determining that the second LiDAR frame is closer in time to a second portion of the different portions of the camera frame than the first LiDAR frame is to the second portion based on a second capture angle of the second portion, the camera frame timestamp, and the second LiDAR frame timestamp; and assigning the second portion to the second LiDAR frame, and wherein generating the depth information for the pixels in the different portions of the camera frame based on the assigned LiDAR frames comprises generating depth information for pixels in the first portion based on depth information from the first LiDAR frame, and generating depth information for pixels in the second portion based on depth information from the second LiDAR frame.

13. The method of claim 10, wherein generating the depth information comprises:

determining respective time differences between the camera frame timestamp and the respective LiDAR frame timestamps of the assigned LiDAR frames;

determining a speed of a vehicle that includes a camera used for capturing the camera frame and a LiDAR used for capturing the LiDAR frames;

scaling depth values from the assigned LiDAR frames based on the speed and the respective time differences; and generating the depth information for the pixels in the different portions of the camera frame based on the scaled depth values of the assigned LiDAR frames.

14. The method of claim 13, wherein generating the depth information for the pixels in the different portions of the camera frame based on the scaled depth values of the assigned LiDAR frames comprises:

generating depth information for a first column of pixels in the camera frame based on scaled depth values of a first LiDAR frame assigned to the first column of pixels; and generating depth information for a second column of pixels in the camera frame based on scaled depth values of a second LiDAR frame assigned to the second column of pixels, wherein the first column and the second column correspond to different capture angles.

15. The method of claim 10, further comprising:

accessing timing information of when the different portions of the camera frame are captured based on a rolling shutter of a camera that captured the camera frame, wherein assigning different portions of the camera frame to different LiDAR frames comprises assigning, at a pixel-level, different pixels of the camera frame to different LiDAR frames based on the camera frame timestamp and respective LiDAR frame timestamps of the different LiDAR frames, the capture angle of the different portions of the camera frame, and the timing information.

16. The method of claim 10, wherein the capture angle range is a yaw angle range, and the capture angle is a yaw angle.

17. The method of claim 10, further comprising controlling an operating parameter of a vehicle based on the depth information.

18. The method of claim 17, wherein the operating parameter comprises one of a braking parameter or a path planning parameter.

19. A computer-readable storage medium storing instructions thereon that when executed cause one or more processors to:

determine a camera frame timestamp indicative of when a camera frame is captured, the camera frame including image content across a capture angle range;

determine a plurality of LiDAR frame timestamps each indicative of when a respective LiDAR frame of a plurality of LiDAR frames is captured over a scan time;

assign different portions of the camera frame to different LiDAR frames based on the camera frame timestamp and respective LiDAR frame timestamps of the different LiDAR frames and based on a capture angle of the different portions of the camera frame, the different LiDAR frames to which the different portions of the camera frame are assigned being assigned LiDAR frames; and generate depth information for pixels in the different portions of the camera frame based on the assigned LiDAR frames.

20. The computer-readable storage medium of claim 19, wherein the instructions that cause the one or more processors to generate the depth information comprise instructions that cause the one or more processors to:

determine which points in the assigned LiDAR frames correspond to which pixels in the camera frame based on capture angles of the pixels and point angles of the points in the assigned LiDAR frames;

determine depth values for the points in the assigned LiDAR frames; and generate the depth information for the pixels in the different portions of the camera frame based on the determined depth values for the points in the assigned LiDAR frames and the correspondence of the points in the assigned LiDAR frames and the pixels in the camera frame.

* * * * *